United States Patent
Takahashi et al.

(10) Patent No.: US 6,866,934 B2
(45) Date of Patent: Mar. 15, 2005

(54) CARBODIIMIDE-CONTAINING HARDENING TYPE REACTIVE PARTICLES, PROCESS FOR PRODUCING THE SAME, AND USE OF THE SAME

(75) Inventors: Ikuo Takahashi, Chiba (JP); Toshifumi Hashiba, Chiba (JP); Kazutoshi Hayakawa, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 46 days.

(21) Appl. No.: 10/386,929

(22) Filed: Mar. 13, 2003

(65) Prior Publication Data

US 2003/0215636 A1 Nov. 20, 2003

(30) Foreign Application Priority Data

Mar. 13, 2002 (JP) .......................................... 2002-68151

(51) Int. Cl.$^7$ ................................................. B32B 5/66
(52) U.S. Cl. ...................... 428/402; 428/403; 428/404; 428/405; 428/406; 428/407
(58) Field of Search ................................. 428/402, 403, 428/404, 405, 406, 407

(56) References Cited

U.S. PATENT DOCUMENTS

| | | | |
|---|---|---|---|
| 5,958,516 A | * | 9/1999 | Imashiro et al. ......... 427/389.8 |
| 6,127,029 A | * | 10/2000 | Imashiro et al. ......... 428/300.1 |
| 6,127,477 A | * | 10/2000 | Imashiro et al. ............ 524/589 |

FOREIGN PATENT DOCUMENTS

| | | |
|---|---|---|
| EP | 0 878 496 A1 | 11/1998 |
| JP | 63-116695 | 5/1988 |
| JP | 2-8272 | 1/1990 |
| JP | 10-30024 | 2/1998 |
| JP | 10-60272 | 3/1998 |
| JP | 2000-155441 | 6/2000 |

OTHER PUBLICATIONS

European Search Report dated Mar. 29, 2004.

* cited by examiner

*Primary Examiner*—Leszek B Kiliman
(74) *Attorney, Agent, or Firm*—Westerman, Hattori, Daniels & Adrian, LLP

(57) ABSTRACT

A hardening type reactive particles which contain a carbodiimide compound in such a way to have the reactive performance the carbodiimide group inherently has only in the surface layer section or both surface layer section and inside of the base particle, without deforming shape of the base particle. The hardening type reactive particles each comprising a base particle (A) of thermoplastic resin having a functional group and carbodiimide compound (B) impregnated only in the surface layer section or both surface layer section and inside of the base particle, wherein the base particle (A) and carbodiimide compound (B) are strong bonded to each other by the crosslinking reaction taking place under heating between the functional group in the former and carbodiimide group in the latter, and a process for producing the same.

17 Claims, No Drawings

CARBODIIMIDE-CONTAINING HARDENING TYPE REACTIVE PARTICLES, PROCESS FOR PRODUCING THE SAME, AND USE OF THE SAME

BACKGROUND OF THE INVENTION

1. Field of the Invention

The present invention relates to carbodiimide-containing, hardening type reactive particles, process for producing the same and use of the same, more particularly hardening type reactive particles each comprising a base particle (A) of thermoplastic resin having a functional group and carbodiimide compound (B) impregnated only in the surface layer section or both surface layer section and inside of the base particle, and process for producing the same and use of the same.

2. Description of the Prior Art

Carbodiimides, having a structure of —N=C=N—, have been widely used as a stabilizer for improving hydrolysis resistance for compounds having an ester group or as a crosslinking agent for resins, e.g., (meth)acrylic resin, having carboxyl group reactive with carbodiimide group, where high reactivity of carbodiimide group is generally utilized.

Various applicable areas have been proposed for carbodiimide resins, e.g., paints, adhesives and coating agents, as disclosed by Japanese Patent Application Laid-Open Nos. 10-60272 and 10-30024, and they have been already commercialized in these areas.

However, most of the resins to be crosslinked with a carbodiimide-containing composition are in the form of solution of molten resin, paste or emulsion. Hardening of solid particles themselves requires a great deal of time and is hence difficult.

Production of polyolefin-based resin particles of crosslinked structure by the reaction with a carbodiimide compound in a melting/kneading machine or the like has been studied, as disclosed by, e.g., Japanese Patent Application Laid-Open No. 2000-155441. However, no particles which can sufficiently satisfy resistance to heat and chemicals have been developed.

Broadly speaking, the processes for producing polymer particles fall into two general categories; (I) production of the objective particles by crushing and classifying the resin produced by, e.g., block or solution polymerization, as known, and (II) production of adequate particles during a polymerization stage, e.g., suspension, emulsion or dispersion polymerization, or seed process based on these processes.

Production of hardened particles usually uses a crosslinkable vinyl-based monomer or polymer to improve resistance to heat and chemicals, or incorporate a crosslinkable monomer or polymer other than a vinyl-based one, e.g., epoxy resin or the like, to improve resistance to heat and solvents.

SUMMARY OF THE INVENTION

It is an object of the present invention to provide hardening type reactive particles each comprising a base particle of thermoplastic resin which contains a carbodiimide compound such that the reactive performance the carbodiimide group inherently has only in the surface layer section or both surface layer section and inside of the base particle, without deforming shape of the base particle.

The inventors of the present invention have found, after having extensively studied to solve the problems involved in the conventional techniques, that a thermoplastic resin particle having a group reactive with carbodiimide group (e.g., hydroxyl, amino, carboxyl or thiol group), when mixed and crosslinked with a carbodiimide resin under heating in the presence of water or an organic solvent which dissolves the carbodiimide resin but not the particle, comes to show resistance both to heat and solvent, and to be a functional reactive particle with at least one carbodiimide group in the surface or both inside and in the surface. The present invention is developed based on the above knowledge.

The first aspect of the present invention provides hardening type reactive particles each comprising a base particle (A) of thermoplastic resin having a functional group and carbodiimide compound (B) impregnated only in the surface layer section or both surface layer section and inside of the base particle, wherein the base particle (A) and carbodiimide compound (B) are strongly bonded to each other by the crosslinking reaction taking place under heating between the functional group in the former and carbodiimide group in the latter.

The second aspect of the present invention provides the hardening type reactive particles of the first aspect, wherein the base particle (A) has an average diameter of 0.01 to 10,000 $\mu$m.

The third aspect of the present invention provides the hardening type reactive particles of the first aspect, wherein the base particle (A) is morphologically truly or nearly spherical.

The fourth aspect of the present invention provides the hardening type reactive particles of the first aspect, wherein the functional group is at least one type of active hydrogen group selected from the group consisting of hydroxyl, carboxyl, amino and thiol group.

The fifth aspect of the present invention provides the hardening type reactive particles of the first aspect, wherein the thermoplastic resin has 30 to 700 equivalents of the functional groups.

The sixth aspect of the present invention provides the hardening type reactive particles of the first aspect, wherein the thermoplastic resin is one of styrene-based polymer, (meth)acrylate-based polymer, a copolymer produced by addition polymerization with another vinyl-based polymer, polymer produced by hydrogen transfer polymerization, polymer produced by polycondensation or polymer produced by addition condensation.

The seventh aspect of the present invention provides the hardening type reactive particles of the first aspect, wherein the carbodiimide compound (B) is the carbodiimide resin represented by the chemical formula (1):

$$R^1-Y-(R^2-N=C=N)_n-R^2-Y-R^3 \qquad (1)$$

(wherein, $R^1$ and $R^3$ are each hydrogen or an organic residue of 1 to 40 carbon atoms, which is a compound having a functional group reactive with isocyanate group left by the functional group, and may be the same or different; $R^2$ is an organic residue which is a diisocyanate made from isocyanate group, wherein the diisocyanates may be different; Y is a bond formed by isocyanate group and a functional group reactive with isocyanate group; "n" is an integer of 1 to 100, representing average degree of polymerization; and each of $R^1$—Y and Y—$R^3$ may be isocyanate group halfway in the reaction to be converted into the carbodiimide).

The eighth aspect of the present invention provides the hardening type reactive particles of the seventh aspect, wherein the carbodiimide resin has 50 to 500 equivalents of the carbodiimide (—NCN—) groups.

The ninth aspect of the present invention provides the hardening type reactive particles of the seventh aspect, wherein the carbodiimide resin has an average molecular weight of 200 to 100,000.

The tenth aspect of the present invention provides the hardening type reactive particles of the seventh aspect, wherein the carbodiimide resin has at least one type of hydrophilic segment and is soluble in water.

The 11$^{th}$ aspect of the present invention provides the hardening type reactive particles of the tenth aspect, wherein the hydrophilic segment is represented by the chemical formula (1) with $R^1$ and $R^3$ being each at least one type of residue represented by one of the chemical formulae (2) to (5):

(i) a residue of alkyl sulfonate having at least one reactive hydroxyl group, represented by:

$$R^5—SO_3—R^4—OH \quad (2)$$

(wherein, $R^4$ is an alkylene group of 1 to 10 carbon atoms; and $R^5$ is an alkali metal), (ii) a quaternary salt of a dialkylaminoalcohol residue represented by:

$$(R^6)_2—NR'—R^7—OH \quad (3)$$

(wherein, $R^6$ is a lower alkyl group of 1 to 4 carbon atoms; $R^7$ is an alkylene or oxyalkylene group of 1 to 10 carbon atoms; and R' is a group derived from an agent for producing a quaternary salt), (iii) a quaternary salt of a dialkylaminoalkylamine residue represented by:

$$(R^6)_2—NR'—R^7—NH_2 \quad (4)$$

(wherein, $R^6$, $R^7$ and R' are each the same as the corresponding one in the formula (3), and (iv) a poly(alkylene oxide) residue capped with alkoxy group at the terminals, having at least one reactive hydroxyl group, represented by:

$$R^8—(O—CHR^9—CH_2)_m OH \quad (5)$$

(wherein, $R^8$ is a lower alkyl group of 1 to 4 carbon atoms; $R^9$ is hydrogen atom or methyl group; and "m" is an integer of 2 to 30).

The 12$^{th}$ aspect of the present invention provides a process for producing the hardening type reactive particles of one of first to 11$^{th}$ aspects comprising two steps: the first step in which the base particle (A) of thermoplastic resin having a functional group is mixed with the carbodiimide compound (B) in the presence of at least one type of solvent which dissolves (B) but not (A), selected from the group consisting of water and organic compounds, to have the latter impregnated only in the surface layer section or both surface layer section and inside of the former; and the subsequent second step in which the above mixture is thermally treated.

The 13$^{th}$ aspect of the present invention provides the process of the 12$^{th}$ aspect, wherein the base particle (A) is morphologically truly or nearly spherical.

The 14$^{th}$ aspect of the present invention provides the process of the 13$^{th}$ aspect, wherein the base particle (A) is the one prepared beforehand by suspension, emulsion, dispersion or seed polymerization.

The 15$^{th}$ aspect of the present invention provides the process of the 12$^{th}$ aspect, wherein the base particle (A) is immersed in a solution of the carbodiimide compound (B) dissolved in at least one type of solvent selected from the group consisting of water and organic solvents in said first step.

The 16$^{th}$ aspect of the present invention provides the process of the 15$^{th}$ aspect, wherein concentration of the carbodiimide compound (B) in the solution is 5 to 60% by weight, determined by the following formula:
Solution concentration (% by weight)=100×(whole solution-solvent)/whole solution.

The 17$^{th}$ aspect of the present invention provides the process of the 12$^{th}$ aspect, wherein the solvent is water, a mixture of water and a lower alcohol, or toluene.

The 18$^{th}$ aspect of the present invention provides the process of the 12$^{th}$ aspect, wherein the base particle (A) is mixed with the carbodiimide compound in a ratio of 0.1 to 20 equivalents of the carbodiimide group in the carbodiimide compound (B) to equivalent of the functional group in the base particle (A).

The 19$^{th}$ aspect of the present invention provides the process of the 12$^{th}$ aspect, wherein the thermal treatment in the second step is effected at 10 to 200° C.

The 20$^{th}$ aspect of the present invention provides the process of the 12$^{th}$ aspect, wherein the thermal treatment in the second step is effected for 1 to 24 hours.

The 21$^{st}$ aspect of the present invention provides the process of the 12$^{th}$ aspect, wherein the functional group is at least one type of active hydrogen group selected from the group consisting of hydroxyl, carboxyl, amino and thiol group.

The 22$^{nd}$ aspect of the present invention provides the process of the 21$^{st}$ aspect, wherein the thermoplastic resin is one of styrene-based polymer, (meth)acrylate-based polymer, a copolymer produced by addition polymerization with another vinyl-based polymer, polymer produced by hydrogen transfer polymerization, polymer produced by polycondensation or polymer produced by addition condensation.

The 23$^{rd}$ aspect of the present invention provides the process of the 12$^{th}$ aspect, wherein the carbodiimide compound (B) has an average molecular weight of 200 to 100,000.

The 24$^{th}$ aspect of the present invention provides the process of the 12$^{th}$ aspect, wherein the carbodiimide compound (B) has at least one type of hydrophilic segment and is soluble in water.

The 25$^{th}$ aspect of the present invention provides the process of the 24$^{th}$ aspect, wherein the hydrophilic segment is represented by the chemical formula (1) with $R^1$ and $R^3$ being each at least one type of residue represented by one of the chemical formulae (2) to (5).

The 26$^{th}$ aspect of the present invention provides the process of the 12$^{th}$ aspect, wherein at least one type of additive selected from the group consisting of dispersant, antioxidant, stabilizer and emulsifier is added to the first step, in addition to the base particle (A) and carbodiimide compound (B).

The 27$^{th}$ to 32$^{nd}$ aspects of the present invention provide a crosslinking agent, stabilizer for improving hydrolysis resistance, thermoplastic resin-hardening agent, adhesive agent, coating material or paint, and reinforcing material for the electric/electronic areas, respectively, which comprise the hardening type reactive particles according to one of claims 1 to 11.

As described above, the present invention relates to hardening type reactive particles each comprising a base particle (A) of thermoplastic resin having a functional group and carbodiimide compound (B) impregnated only in the surface layer section or both surface layer section and inside of the base particle, wherein the base particle (A) and carbodiimide compound (B) are strongly bonded to each other by the crosslinking reaction taking place under heating between the functional group in the former and carbodiimide group in the latter, a process for producing the same, and use of the same. The preferred embodiments include the followings:

(1) The hardening type reactive particles of the first aspect of the present invention, wherein the particles are semi-hardened.

(2) The hardening type reactive particles of the first aspect of the present invention, wherein the base particle (A) is non-spherical.

(3) The process for producing the hardening type reactive particles of (2), wherein the base particle (A) is produced by block polymerization, solution polymerization or dropping method.

(4) The process of the 12$^{th}$ aspect of the present invention for producing the hardening type reactive particles, wherein the solvent is selected from the group consisting of dimethylformamide (DMF), tetrahydrofuran (THF), methylethylketone (MEK), methylisobutylketone (MIBK), acetone, N-methyl-2-pyrrolidone (NMP), dichloromethane and tetrachloroethylene.

DETAILED DESCRIPTION OF THE INVENTION

The present invention is described below in detail for each item.

1. Hardening Type Reactive Particles

Each of the hardening type reactive particles of the present invention comprises a base particle (A) of thermoplastic resin having a functional group and carbodiimide compound (B) impregnated only in the surface layer section or both surface layer section and inside of the base particle, wherein the base particle (A) and carbodiimide compound (B) are strongly bonded to each other by the crosslinking reaction taking place under heating between the functional group in the former and carbodiimide group in the latter.

The hardening type reactive particle has a chemical structure, conceptually illustrated below:

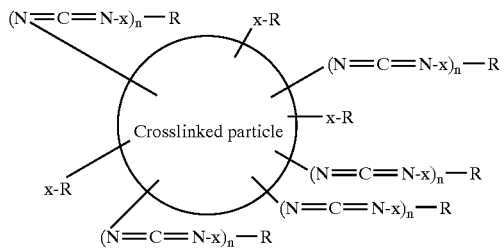

In the above chemical formula, "n" is random, and some (at least one) of the carbodiimide groups in the polycarbodiimide molecule are bonded to the particle inside or surface (surface layer section). The one whose terminal R is a reactive group, e.g., isocyanate, is reactive with a terminal group.

Moreover, the carbodiimide group can be preferentially bonded to the thermoplastic resin particle surface (surface layer section) or crosslinked only on the particle surface (surface layer section), as required, by selecting the carbodiimide resin type.

The hardening type reactive particles may be hardened or semi-hardened.

2. Carbodiimide Compound (B)

The carbodiimide compound (B) for the hardening type reactive particles of the present invention is the carbodiimide resin (or polycarbodiimide) represented by the chemical formula (1):

$$R^1-Y-(R^2-N=C=N)_n-R^2-Y-R^3 \qquad (1)$$

(wherein, $R^1$ and $R^3$ are each hydrogen or an organic residue of 1 to 40 carbon atoms, which is a compound having a functional group reactive with isocyanate group left by the functional group, and may be the same or different; $R^2$ is an organic residue which is a diisocyanate left by isocyanate group, where the diisocyanates may be different; Y is a bond formed by isocyanate group and a functional group reactive with isocyanate group; "n" is an integer of 1 to 100, representing average degree of polymerization; and each of $R^1-Y$ and $Y-R^3$ may be isocyanate group halfway in the reaction to be converted into the carbodiimide).

In more detail, $R^1$ or $R^3$ in the general formula (1) is at least one type of segment composed of a residue represented by a compound having a functional group or bond reactive with isocyanate group.

The representative examples of the functional group or bond include:

(a) hydroxide group —OH (including $H_2O$)
(b) mercapto group —SH
(c) amino group —$NH_2$
(d) carboxyl group —COOH
(e) isocyanate group —NCO
(f) urethane bond —NHCOO—
(g) urea bond —NHCONH—
(h) amide bond —NHCO—
(i) carbodiimide bond —NCN—
(j) dimerized isocyanate bond

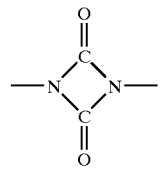

More specifically, the representative compounds reactive with isocyanate group include:

(a) compounds containing hydroxyl group (—OH): (i) monovalent alcohols, e.g., methyl alcohol, ethyl alcohol, propyl alcohol, isopropyl alcohol, n-butyl alcohol, sec-butyl alcohol and tert-butyl alcohol; (ii) saturated or unsaturated glycols, e.g., ethylene glycol, propylene glycol, trimethylol propane, pentaerythritol, 1,2-propanediol, 1,3-propanediol, 1,3-butanediol, 1,4-butanediol, neopentyl glycol, pentanediol, hexanediol, octanediol, 1,4-butenediol, diethylene glycol, triethylene glycol and dipropylene glycol; (iii) cellosolve; e.g., methyl cellosolve, ethyl cellosolve and butyl cellosolve; (iv) (meth)acrylate-based monomers, e.g., 2-hydroxyethyl (meth)acrylate, 2-hydroxypropyl (meth)acrylate, 3-hydroxypropyl (meth)acrylate and 4-hydroxybutyl (meth)acrylate; (v) polyalkylene glycol (meth)acrylate-based compounds, e.g., polyethylene glycol mono(meth)acrylate and polypropylene glycol mono(meth)acrylate; (vi) various types of hydroxyalkyl vinyl ethers, e.g., hydroxyethyl vinyl ether and hydroxybutyl vinyl ether; (vii) various allyl following composition all at once, and heated for around 15 hours in a flow of nitrogen with stirring by an agitator in an oil bath kept at 60° C., to prepare the carbodiimide-containing, crosslinked particle solution.

compounds, e.g., allyl alcohol and 2-hydroxyethyl allyl ether; (viii) alkyl glycidyl ethers, e.g., n-butyl glycidyl ether and 2-ethylhexyl glycidyl ether; and (ix) high-molecular-weight compounds containing hydroxyl group, e.g., polyethylene glycol and polypropylene glycol (these compounds may be used either individually or in combination);

(b) compounds containing mercapto group: (i) aliphatic alkyl mono-functional thiols, e.g., methanethiol, ethanethiol, n- and iso-propanethiol, n- and iso-butanethiol, pentanethiol, hexanethiol, heptanethiol, octanethiol, nonanethiol, decanethiol and cyclohexanethiol; (ii) aliphatic thiols having a heterocyclic ring, e.g., 1,4-dithian-2-thiol, 2-(1-mercaptomethyl)-1,4-dithian, 2-(1-mercaptoethyl)-1,4-dithian, 2-(1-mercaptopropyl)-1,4-dithian, 2-(mercaptobutyl)-1,4-dithian, tetrahydrothiophene-2-thiol, tetrahydrothiophene-3-thiol, pyrrolidine-2-thiol, pyrrolidine-3-thiol, tetrahydrofuran-2-thiol, tetrahydrofuran-3-thiol, piperidine-2-thiol, piperidine-3-thiol and piperidine-4-thiol; (iii) aliphatic thiols having a hydroxy group, e.g., 2-mercaptoethanol, 3-mercaptopropanol and thioglycerol; (iv) compounds having a double bond, e.g., 2-mercaptoethyl (meth) acrylate, 2-mercapto-1-carboxyethyl (meth)acrylate, N-(2-mercaptoethyl)acrylamide, N-(2-mercapto-1-carboxyethyl)acrylamide, N-(2-mercaptoethyl) methacrylamide, N-(4-mercaptophenyl)acrylamide, N-(7-mercaptonaphthyl)acrylamide and mono-2-mercaptoethylamide maleate; (v) aliphatic dithiols, e.g., 1,2-ethanedithiol, 1,3-propanedithiol, 1,4-butanedithiol, 1,6-hexanedithiol, 1,8-octanedithiol, 1,2-cyclohexanedithiol, ethylene glycol bisthioglycolate, ethylene glycol bisthiopropionate, butanediol bisthioglycolate, butanediol bisthiopropionate, trimethylolpropane tristhioglycolate, trimethylolpropane tristhiopropionate, pentaerythritol tetrakisthioglycolate, pentaerythritol tetrakisthiopropionate, tris(2-mercaptoethyl) isocyanurate and tris(3-mercaptopropyl)isocyanurate; (vi) aromatic dithiols, e.g., 1,2-benzenedihiol, 1,4-benzenedihiol, 4-methyl-1,2-benzenedihiol, 4-butyl-1,2-benzenedihiol and 4-chloro-1,2-benzenedihiol; and (vii) high-molecular-weight compounds containing mercapto group, e.g., modified polyvinyl alcohol containing mercapto group (these compounds may be used either individually or in combination);

(c) compounds containing amino group: (i) aliphatic or aromatic amine-containing compounds, e.g., ammonia, methylamine, ethylamine, n-propylamine, isopropylamine, monoethanolamine, n-propanolamine, isopropanolamine, aniline, cyclohexylamine, n-butylamine, n-pentylamine, n-hexylamine, n-heptylamine, n-octylamine, n-nonylamine, n-decylamine, n-undecylamine, n-dodecylamine, n-tridecylamine, n-tetradecylamine, n-pentadecylamine, n-hexadecylamine, n-heptadecylamine, n-octadecylamine, n-eicosylamine, aminomethyltrimethylsilane, aminomethyltriethylsilane, aminomethyltripropylsilane, aminoethyltrimethylsilane, aminoethyltriethylsilane, aminoethyltripropylsilane, aminopropyltrimethylsilane, aminopropyltriethylsilane, aminopropyltripropylsilane, aminomethyltrimethoxysilane, aminomethyltriethoxysilane, aminomethyltripropoxysilane, aminomethyldimethoxymethylsilane, aminomethylmethoxydimethylsilane, aminomethyldiethoxymethylsilane, aminomethylethoxydimethylsilane, aminomethyldimethoxyethylsilane, aminomethylmethoxydiethylsilane, aminomethyldiethoxyethylsilane, aminomethylethoxydiethylsilane, aminoethyldimethoxymethylsilane, aminoethylmethoxydimethylsilane, aminoethyldiethoxymethylsilane, aminoethylethoxydimethylsilane, aminoethyldimethoxyethylsilane, aminoethylmethoxydiethylsilane, aminoethyldiethoxyethylsilane, aminoethylethoxydiethylsilane, aminopropyldimethoxymethylsilane, aminopropylmethoxydimethylsilane, aminopropyldiethoxymethylsilane, aminopropylethoxydimethylsilane, aminopropyldimethoxyethylsilane, aminopropylmethoxydiethylsilane, aminopropyldiethoxyethylsilane, aminopropylethoxydiethylsilane, aminomethylphenyldimethylsilane, diethylamine, diethanolamine, di-n-propanolamine, di-isopropanolamine, N-methylethanolamine and N-ethylethanolamine; (ii) alkylamino acrylates, e.g., dimethylaminoethyl acrylate, diethylaminoethyl acrylate, dimethylaminomethyl acrylate, diethylaminomethyl acrylate, adduct of diacrylate and diethylamine, and adduct of trimethylolpropane triacrylate and diethylamine; (iii) alkylaminoalkylvinyl ethers, e.g., (meth)acrylamide, α-ethyl (meth) acrylamide, N-methyl (meth)acrylamide, N-butoxymethyl (meth)acrylamide, diacetone (meth) acrylamide, N,N-dimethyl (meth)acrylamide, N,N-diethyl (meth)acrylamide, N,N-dimethyl-p-styrenesulfoamide, N,N-dimethylaminoethyl (meth) acrylate, N,N-diethylaminoethyl (meth)acrylate, N,N-dimethylaminopropyl (meth)acrylate, N,N-diethylaminopropyl (meth)acrylate, N-[2-(meth) acryloyloxyethyl]piperidine, N-[2-(meth) acryloyloxyethylene]pyrrolidine, N-[2-(meth) acryloyloxyethyl]morpholine, 4-(N,N-dimethylamino) styrene, 4-(N,N-diethylamino)styrene, 4-vinyl pyridine, 2-dimethylaminoethylvinyl ether, 2-diethylaminoethylvinyl ether, 4-dimethylaminobutylvinyl ether, 4-diethylaminobutylvinyl ether and 6-dimethylaminohexylvinyl ether; and (iv) high-molecular-weight compounds containing amino group (these compounds may be used either individually or in combination);

(d) compounds containing carboxyl group: (i) saturated aliphatic monocarboxylates, e.g., formic, acetic, propionic, isovaleric and hexanoic acid; (ii) saturated aliphatic dicarboxylates, e.g., oxalic, malonic and succinic acid; (iii) organic carboxylic acids, e.g., 2-acryloyloxyethylsuccinic and 3-acryloyloxypropylphthalic acid; (iv) carbocyclic carboxylic acids, e.g., benzoic, toluyl and salicylic acid; (v) heterocyclic carboxylic acids, e.g., furancarboxylic, thiophenecarboxylic and pyridinecarboxylic acid; (vi) various unsaturated mono- or di-carboxylic or unsaturated dibasic acids, e.g., acrylic, methacrylic, crotonic, itaconic, maleic and fumaric acid, and monobutyl itaconate and monobutyl maleate; (vii) acid anhydrates derived from carboxylic acid, e.g., acetic, succinic and phthalic anhydride; and (viii) high-molecular-weight carboxylic acids, e.g., polyacrylic and polymethacrylic acid (these compounds may be used either individually or in combination);

(e) compounds containing isocyanate group: (i) cyclohexyl isocyanate, n-decyl isocyanate, n-undecyl isocyanate, n-dodecyl isocyanate, n-tridecyl isocyanate, n-tetradecyl isocyanate, n-pentadecyl isocyanate, n-hexadecyl isocyanate, n-heptadecyl isocyanate, n-octadecyl isocyanate, n-eicosyl isocyanate, phenyl isocyanate and naphthyl isocyanate; and (ii) isocyanate compounds having 2 or more isocyanate groups, e.g., those used for carbodiimidated resins (these compounds may be used either individually or in combination); and (f) to (j): compounds having a representative bonding group reactive with an isocyanate group, which can be produced by polymerization of the compound of (a) to (e), respectively, with a varying isocyanate compound under heating in the presence or absence of catalyst.

The representative compounds reactive with isocyanate group are not limited to those compounds (a) to (j). Any compound may be used, so long as it has a functional group or bond reactive with isocyanate group (e.g., acid anhydride and compound having a double bond). They may be used either individually or in combination.

When $R^1$ or $R^3$ in the chemical formula (1) is a residue represented by the compound of one of (a) to (j) having the functional group or bond, the bond Y is represented by:

(a') urethane bond —NHCOO—

(b') thiourethane bond —NHCSO—

(c') urea bond —NHCONH—

(d') amide bond —NHCO—

(e') carbodiimide bond —NCN—(in the presence of a catalyst) or dimerized isocyanate bond

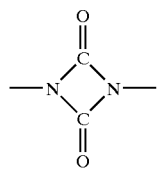

(f') allophanate

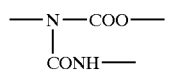

(g') burrette bond

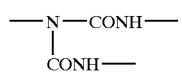

(h') acylurea bond

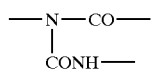

(i') uretonimine bond

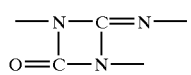

(j') trimerized isocyanate bond

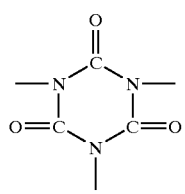

The carbodiimide resin represented by the chemical formula (1) has an average molecular weight of 200 to 100,000, preferably 500 to 50,000.

The isocyanates as the starting compounds for producing the carbodiimide compound for the present invention include those having per molecule at least 2 isocyanate groups, preferably one or more isocyanates selected from bifunctional isocyanate, hexamethylene diisocyanate (hereinafter sometimes referred to as HDI), hydrogenated xylylene diisocyanate ($H_6XDI$), xylylene diisocyanate (XDI), 2,2,4-trimethylhexamethylene diisocyanate (TMHDI), 1,12-diisocyanatedodecane (DDI), norbornane diisocyanate (NBDI), 4,4'-dicyclohexylmethane diisocyanate (HMDI) and tetramethylxylylene diisocyanate (TMXDI), isophorone diisocyanate (IPDI), 2,4,6-triusopropylphenyl diisocyanate (TIDI), 4,4'-diphenylmethane diisocyanate (MDI), tolylene diisocyanate (TDI) and hydrogenated tolylene diisocyanate (HTDI), among others.

The first step for producing the carbodiimide compound for the present invention is heating the above-described isocyanate in the presence of a carbodiimidation catalyst.

The catalyst useful for the present invention is not limited, so long as it can accelerate the carbodiimidation reaction, but organophosphorus-based compounds are suitable, in particular phospholene oxides for their activity.

More specifically, these phospholene oxides include 3-methyl-1-phenyl-2-phospholene-1-oxide, 3-methyl-1-ethyl-2-phospholene-1-oxide, 1,3-dimethyl-2-phospholene-1-oxide, 1-phenyl-2-phospholene-1-oxide, 1-ethyl-2-phospholene-1-oxide, 1-methyl-2-phospholene-1-oxide and a double-bond isomer thereof, of which 3-methyl-1-phenyl-2-phospholene-1-oxide is more suitable for its industrial availability. Timing of incorporation of the carbodiimidation catalyst is not limited, i.e., it may be incorporated before, during or after the isocyanate is heated. It is however preferable to incorporate the catalyst while the reaction system is at a relatively low temperature for safety considerations.

The first step for producing the carbodiimide compound for the present invention is heating the above-described isocyanate in the presence of a carbodiimidation catalyst, as described above. The synthesis process may be effected in the presence or absence of a solvent, or a solvent may be added while the reaction process is proceeding. Whether a solvent is used or not, or its addition timing, when used, can be selected depending on specific purposes or objects of the carbodiimide compound.

The specific examples of the solvents useful for the present invention include ketones, e.g., acetone, methylethylketone, methylisobutylketone and cyclohexanone; esters, e.g., ethyl acetate, butyl acetate, ethyl propionate and cellosolve acetate; aliphatic or aromatic hydrocarbons, e.g., pentane, 2-methylbutane, n-hexane, cyclohexane, 2-methylpentane, 2,2-dimethylbutane, 2,3-dimethylbutane, heptane, n-octane, isooctane, 2,2,3-trimethylpentane, decane, nonane, cyclopentane, methylcyclopentane, methylcyclohexane, ethylcyclohexane, p-menthane, benzene, toluene, xylene and ethylbenzene; halogenated hydrocarbons, e.g., carbon tetrachloride, trichloroethylene, chlorobenzene and tetrabromoethane; ethers, e.g., ethyl ether, dimethyl ether, trioxane and tetrahydrofuran; acetals, e.g., methylal and diethyl acetal; and sulfur- or nitrogen containing organic compounds, e.g., nitropropene, nitrobenzene, pyridine, dimethylformamide and dimethylsulfoxide. The solvent is not limited, so long as it is not harmful to the isocyanate or carbodiimide group during the synthesis process, and can be selected, as required, for a specific purpose of the polymerization process. These solvents may be used either individually or in combination.

The following compounds may be used as diluents, in addition to the above solvents, provided that the carbodiimide resin terminal is capped with the hydrophilic segment, described later, after completion of the synthesis process: water; alcohols, e.g., methanol, ethanol, 1-propanol, 2-propanol, 1-butanol, 2-butanol, isobutyl alcohol, tert-butyl alcohol, 1-pentanol, 2-pentanol, 3-pentanol, 2-methyl-1-butanol, isopentyl alcohol, tert-pentyl alcohol, 1-hexanol, 2-methyl-1-pentanol, 4-methyl-2-pentanol, 2-ethyl butanol, 1-heptanol, 2-heptanol, 3-heptanol, 2-octanol, 2-ethyl-1-hexanol, benzyl alcohol and cyclohexanol; and ether alcohols, e.g., methyl cellosolve, ethyl cellosolve, isopropyl cellosolve, butyl cellosolve and diethylene glycol monobutyl ether. These may be used either individually or in combination. When used as a diluent, the above compound is preferably used at a relatively low temperature, because of high reactivity of the carbodiimide group.

A water-soluble polycarbodiimide is preferably used as the carbodiimide compound for the present invention, on account of recent environmental considerations.

Such a polycarbodiimide has a hydrophilic segment which is represented by, e.g., the chemical formula (1) with $R^1$ or $R^3$ being at least one type of residue represented by one of the chemical formulae (2) to (5).

(i) A residue of alkyl sulfonate having at least one reactive hydroxyl group, represented by:

$$R^5-SO_3-R^4-OH \qquad (2)$$

(wherein, $R^4$ is an alkylene group of 1 to 10 carbon atoms; and $R^5$ is an alkali metal).

The alkyl sulfonates include sodium hydroxyethanesulfonate and sodium hydroxypropanesulfonate, of which the latter is more preferable.

(ii) A quaternary salt of a dialkylaminoalcohol residue represented by:

$$(R^6)_2-NR'-R^7-OH \qquad (3)$$

(wherein, $R^6$ is a lower alkyl group of 1 to 4 carbon atoms; $R^7$ is an alkylene or oxyalkylene group of 1 to 10 carbon atoms; and R' is a group derived from an agent for producing a quaternary salt).

The dialkylaminoalcohols include 2-dimethylaminoethanol, 2-diethylaminoethanol, 3-dimethylamino-1-propanol, 3-diethylamino-1-propanol, 3-diethylamino-2-propanol, 5-diethylamino-2-propanol and 2-(di-n-butylamino)ethanol, of which 2-dimethylaminoethanol is more preferable.

The agents for producing a quaternary salt include dimethylsulfuric acid and methyl p-toluenesulfonate.

(iii) A quaternary salt of a dialkylaminoalkylamine residue represented by:

$$(R^6)_2-NR'-R^7-NH_2 \qquad (4)$$

(wherein, $R^6$, $R^7$ and R' are each the same as the corresponding one in the formula (3).

The dialkylaminoalkylamines include 3-dimethylamino-n-propylamine, 3-diethylamino-n-propylamine and 2-(diethylamino)ethylamine, of which 3-dimethylamino-n-propylamine is more preferable.

The agents for producing a quaternary salt include dimethylsulfuric acid and methyl p-toluenesulfonate.

(iv) A poly(alkylene oxide) residue sealed with alkoxy group at the terminals, having at least one reactive hydroxyl group, represented by:

$$R^8-(O-CHR^9-CH_2)_m-OH \qquad (5)$$

(wherein, $R^8$ is a lower alkyl group of 1 to 4 carbon atoms; $R^9$ is hydrogen atom or methyl group; and "m" is an integer of 2 to 30).

The poly(alkylene oxides) include poly(ethylene oxide) monomethyl ether, poly(ethylene oxide)monoethyl ether, poly(ethylene oxide/propylene oxide)monomethyl ether and poly(ethylene oxide/propylene oxide)monoethyl ether, of which poly(ethylene oxide)monomethyl ether is more preferable.

3. Base Particle (A) of Thermoplastic Resin and Method for Producing the Same

The processes for producing the base particle (A) of thermoplastic resin having a functional group for the present invention include those for producing a thermoplastic resin having a functional group reactive with carbodiimide group (e.g., hydroxyl, carboxyl, amino or thiol group) and particles thereof. More specifically, they include:

(1) A process for producing the solution thermoplastic resin by common block or solution polymerization, and particles thereof by crushing and classifying the resin.

(2) A process for producing the thermoplastic resin by the above polymerization process, and particles (including spherical particles) thereof by dropping the polymer.

(3) A process for producing the thermoplastic resin and particles (including spherical particles) thereof by emulsion or suspension polymerization effected in an aqueous solution.

(4) A process for producing the thermoplastic resin and particles (including spherical particles) thereof by the above process (3) combined with a seed process or the like.

(5) A process for producing the thermoplastic resin and particles (mainly spherical particles) thereof by dispersion polymerization in a non-aqueous solvent or water-mixed solvent.

(6) A process for producing the thermoplastic resin and particles thereof by the above process (5) combined with a seed process or the like.

(7) Extrusion or the like to produce pellets, particles or film-shaped articles of the thermoplastic resin.

(8) Injection molding or the like to produce formed articles of the thermoplastic resin.

The processes for the present invention are not limited to the above, and any process may be used so long as it produces the composition and particles thereof which satisfy the necessary conditions, e.g., quantity of the functional group in the thermoplastic resin and particles thereof, particle size, and thickness of the formed article.

In the process for producing the base particle (A) of thermoplastic resin, the particles produced by one of the above polymerization processes may have a crosslinked structure beforehand, and can be used for producing the hardening type reactive particles of the present invention.

The base particle (A) of thermoplastic resin for the present invention is the one having a functional group reactive with carbodiimide group. More specifically, it has an active hydrogen group, e.g., hydroxyl (—OH), carboxyl (—COOH), amino (—NH$_2$) or thiol (—SH) group.

The base particle of thermoplastic resin has a weight-average molecular weight of around 1,000 to 3,000,000, or 3,000 to 500,000 when it is spherical.

The thermoplastic resin is one of styrene-based polymer, (meth)acrylate-based polymer, a copolymer produced by addition polymerization with another vinyl-based polymer, polymer produced by hydrogen transfer polymerization, polymer produced by polycondensation and polymer produced by addition condensation.

The specific examples of the representative starting copolymerizable monomers as the main component for the above polymer include (i) styrenes, e.g., styrene, o-methyl styrene, m-methyl styrene, p-methyl styrene, a-methyl styrene, p-ethyl styrene, 2,4-dimethyl styrene, p-n-butyl styrene, p-tert-butyl styrene, p-n-hexyl styrene, p-n-octyl styrene, p-n-nonyl styrene, p-n-decyl styrene, p-n-dodecyl styrene, p-methoxystyrene, p-phenyl styrene, p-chlorostyrene and 3,4-dichlorostyrene; (ii) (meth)acrylate esters, e.g., methyl acrylate, ethyl acrylate, n-butyl acrylate, isobutyl acrylate, propyl acrylate, hexyl acrylate, 2-ethylhexyl acrylate, n-octyl acrylate, dodecyl acrylate, lauryl acrylate, stearyl acrylate, 2-chloroethyl acrylate, phenyl acrylate, methyl α-chloroacrylate, methyl methacrylate, ethyl methacrylate, n-butyl methacrylate, isobutyl methacrylate, propyl methacrylate, hexyl methacrylate, 2-ethylhexyl methacrylate, n-octyl methacrylate, dodecyl methacrylate, lauryl methacrylate and stearyl methacrylate; (iii) vinyl esters, e.g., vinyl acetate, vinyl propionate, vinyl benzoate and vinyl butyrate; (iv) (meth)acrylic acid derivatives, e.g., acrylonitrile and methacrylonitrile; (v) vinyl ethers, e.g., vinyl methyl ether, vinyl ethyl ether and vinyl isobutyl ether; (vi) vinyl ketones, e.g., vinyl methylketone, vinyl hexylketone and methylisopropenylketone; (vii) N-vinyl compounds, e.g., N-vinyl pyrrole, N-vinyl carbazole, N-vinyl indole and N-vinyl pyrrolidone; and (viii) (meth) acrylate esters having a fluorine-containing alkyl group, e.g., vinyl fluoride, vinylidene fluoride, tetrafluoroethylene, hexafluoropropylene, trifluoroethyl acrylate and tetrafluoropropyl acrylate. These compounds may be used either individually or in combination.

The specific examples of the representative radical-polymerizable monomers having carboxyl group as the functional group reactive with carbodiimide group include various unsaturated mono- and di-carboxylic acids and unsaturated dibasic acids, e.g., acrylic, methacrylic, crotonic, itaconic, maleic and fumaric acid, and monobutyl itaconate and monobutyl maleate. These compounds may be used either individually or in combination.

The specific examples of the representative radical-polymerizable monomers having hydroxyl group as the functional group reactive with carbodiimide group include (meth)acrylate-based monomers, e.g., 2-hydroxyethyl (meth)acrylate, 2-hydroxypropyl (meth)acrylate, 3-hydroxypropyl (meth)acrylate and 4-hydroxybutyl (meth) acrylate; polyalkylene glycol (meth)acrylate-based compounds, e.g., polyethylene glycol mono(meth)acrylate and polypropylene glycol mono(meth)acrylate; various types of hydroxyalkyl vinyl ethers, e.g., hydroxyethyl vinyl ether and hydroxybutyl vinyl ether; and various allyl compounds, e.g., allyl alcohol and 2-hydroxyethyl allyl ether. These compounds may be used either individually or in combination.

The specific examples of the representative polymers having hydroxyl group include thermoplastic resins having hydroxyl group, e.g., totally or partially saponified resins (e.g., polyvinyl alcohol (PVA), and saponified resins (e.g., acetate esters composed of a copolymer of vinyl acetate and another vinyl monomer). These polymers are also useful for the present invention.

The specific examples of the representative radical-polymerizable monomers or compounds having amino group as the functional group reactive with carbodiimide group include (meth)acrylamide, α-ethyl (meth)acrylamide, N-methyl (meth)acrylamide, N-butoxymethyl (meth) acrylamide, diacetone (meth)acrylamide, N,N-dimethyl (meth)acrylamide, N,N-diethyl (meth)acrylamide, N,N-dimethyl-p-styrenesulfoamide, N,N-dimethylaminoethyl (meth) acrylate, N,N-diethylaminoethyl (meth)acrylate, N,N-dimethylaminopropyl (meth)acrylate, N,N-diethylaminopropyl (meth)acrylate, N-[2-(meth) acryloyloxyethyl]piperidine, N-[2-(meth) acryloyloxyethylene]pyrrolidine, N-[2-(meth) acryloyloxyethyl]morpholine, 4-(N,N-dimethylamino) styrene, 4-(N,N-diethylamino)styrene, 4-vinyl pyridine, 2-dimethylaminoethylvinyl ether, 2-diethylaminoethylvinyl ether, 4-dimethylaminobutylvinyl ether, 4-diethylaminobutylvinyl ether and 6-dimethylaminohexylvinyl ether. These compounds may be used either individually or in combination.

The specific examples of the representative radical-polymerizable monomers or compounds having thiol (mercapto) group as the functional group reactive with carbodiimide group include those having a double bond, e.g., 2-propene-1-thiol, 3-butene-1-thiol, 4-pentene-1-thiol, 2-mercaptoethyl (meth)acrylate, 2-mercapto-1-carboxyethyl (meth)acrylate, N-(2-mercaptoethyl)acrylamide, N-(2-mercapto-1-carboxyethyl)acrylamide, N-(2-mercaptoethyl) methacrylamide, N-(4-mercaptophenyl)acrylamide, N-(7-mercaptonaphthyl)acrylamide and mono-2-mercaptoethylamide maleate; and compounds having a crosslinked structure between a compound having at least 2 functional groups (e.g., tetramethylenedithiol, hexamethylenedithiol, octamethylenedithiol or decamethylenedithiol) and monomer having a group reactive with thiol (mercapto) group and —C═C— double bond. These compounds may be used either individually or in combination. Thermoplastic resins having thiol (mercapto) group, e.g., modified polyvinyl alcohol having thiol (mercapto) group, are also useful for the present invention.

When 2 or more functional groups, e.g., carboxyl, hydroxyl, amino and thiol (mercapto) group, are to be incorporated, the above-described monomers having a varying reactive group may be combined with each other to produce a multi-functional copolymer. Moreover, multi-functional polymer particles containing carbodiimide group can be produced by adjusting carbodiimide resin content or reaction temperature.

For radical polymerization to produce the thermoplastic resin for the present invention, a known radical polymerization initiator may be used.

The specific examples of the representative radical polymerization initiators include peroxides, e.g., benzoyl peroxide, cumene hydroperoxide, t-butyl hydroperoxide; persulfates, e.g., sodium persulfate and ammonium persulfate; and azo-based compounds, e.g., azobisisobutylonitrile, azobismethylbutylonitrile and azobisisovaleronitrile. These compounds may be used either individually or in combination.

For production of the thermoplastic resin particles reactive with carbodiimide group, various synthesis/polymerization processes described above may be employed; they may be synthesized in the absence of solvent, e.g., block polymerization, or in the presence of solvent, e.g., solution polymerization.

The specific examples of the representative polymerization solvents include water; alcohols, e.g., methanol, ethanol, 1-propanol, 2-propanol, 1-butanol, 2-butanol, isobutyl alcohol, tert-butyl alcohol, 1-pentanol, 2-pentanol, 3-pentanol, 2-methyl-1-butanol, isopentyl alcohol, tert-pentyl alcohol, 1-hexanol, 2-methyl-1-pentanol, 4-methyl-2-pentanol, 2-ethyl butanol, 1-heptanol, 2-heptanol, 3-heptanol, 2-octanol, 2-ethyl-1-hexanol, benzyl alcohol and cyclohexanol; and ether alcohols, e.g., methyl cellosolve, ethyl cellosolve, isopropyl cellosolve, butyl cellosolve, and diethylene glycol monobutyl ether; ketones, e.g., acetone, methylethylketone, methylisobutylketone and cyclohexanone; esters, e.g., ethyl acetate, butyl acetate, ethyl propionate and cellosolve acetate; aliphatic or aromatic hydrocarbons, e.g., pentane, 2-methylbutane, n-hexane, cyclohexane, 2-methylpentane, 2,2-dimethylbutane, 2,3-dimethylbutane, heptane, n-octane, isooctane, 2,2,3-trimethylpentane, decane, nonane, cyclopentane, methylcyclopentane, methylcyclohexane, ethylcyclohexane, p-menthane, dicyclohexane, benzene, toluene, xylene and ethylbenzene; halogenated hydrocarbons, e.g., carbon tetrachloride, trichloroethylene, chlorobenzene and tetrabromoethane; ethers, e.g., ethyl ether, dimethyl ether, trioxane and tetrahydrofuran; acetals, e.g., methylal and diethyl acetal; fatty acids, e.g., formic, acetic and propionic acid; and sulfur- or nitrogen containing organic compounds, e.g., nitropropene, nitrobenzene, dimethyl amine, monoethanolamine, pyridine, dimethylformamide and dimethylsulfoxide. The solvent is not limited, and can be selected, as required, for a specific purpose of the polymerization process. These solvents may be used either individually or in combination.

A specific polymerization may incorporate, as required, one or more additives, e.g., polymer dispersant, stabilizer, emulsifier and surfactant, for production of the particles.

The specific examples of the representative additives are cited. The dispersants and stabilizers include various hydrophilic and hydrophobic ones, such as polystyrene derivatives, e.g., polyhydroxystyrene, polystyrenesulfonic acid, vinyl phenol/(meth)acrylate ester copolymer, styrene/(meth)acrylate ester copolymer and styrene/vinyl phenol/(meth)acrylate ester copolymer; poly(meth)acrylic acid and derivatives thereof, e.g., poly(meth)acrylic acid, poly(meth) acrylamide, polyacrylonitrile, polyethyl (meth)acrylate and polybutyl (meth)acrylate; polyvinyl alkyl ether derivatives, e.g., polymethyl vinyl ether, polyethyl vinyl ether, polybutyl vinyl ether and polyisobutyl vinyl ether; cellulose and derivatives thereof, e.g., cellulose, methyl cellulose, cellulose acetate, cellulose nitrate, hydroxymethyl cellulose, hydroxyethyl cellulose, hydroxypropyl cellulose and carboxymethyl cellulose; polyvinyl acetate and derivatives thereof e.g., polyvinyl alcohol, polyvinyl butyral, polyvinyl formal, and polyvinyl acetate; nitrogen-containing polymer derivatives, e.g., polyvinyl pyridine, polyvinyl pyrrolidone, polyethyleneimine and poly-2-methyl-2-oxazoline; halogenated polyvinyl derivatives, e.g., polyvinyl chloride and polyvinylidene chloride; and polysiloxane derivatives, e.g., polydimethyl siloxane. These may be used either individually or in combination.

The emulsifiers (surfactants) useful for the present invention include anionic emulsifiers, including alkyl sulfate ester salts, e.g., sodium lauryl sulfate, alkyl benzenesulfonates, e.g., sodium dodecylbenzenesulfonate, alkylnaphthalenesulfonates, fatty acid salts, alkyl phosphates, and alkylsulfosuccinates; cationic emulsifiers, including alkylamine salts, quarternary ammonium salts, alkyl betaine, and amine oxide; nonionic emulsifiers, including polyoxyethylene alkyl ether, polyoxyethylene alkyl allyl ether, polyoxyethylene alkyl phenyl ether, sorbitan/fatty acid ester, glycerin/fatty acid ester and polyoxyethylene/fatty acid ester. These may be used either individually or in combination.

When the resin or its particles are produced, a small quantity of crosslinking agent may be incorporated, depending on their purposes.

The specific examples of the representative crosslinking agents include aromatic divinyl compounds, e.g., divinyl benzene and divinyl naphthalene, ethylene glycol diacrylate, ethylene glycol dimethacrylate, triethylene glycol dimethacrylate, tetraethylene glycol dimethacrylate, 1,3-butylene glycol dimethacrylate, trimethylolpropane triacrylate, trimethylolpropane trimethacrylate, 1,4-butanediol diacrylate, neopentyl glycol diacrylate, 1,6-hexanediol diacrylate, pentaerythritol triacrylate, pentaerythritol tetraacrylate, pentaerythritol dimethacrylate, pentaerythritol tetramethacrylate, glycerol acryloxydimethacrylate, N,N-divinyl aniline, divinyl ether, divinyl sulfide and divinyl sulfone. These may be used either individually or in combination.

4. Process for Producing the Hardening Type Reactive Particles

The hardening type reactive particles of the present invention are produced first by producing a thermoplastic resin having a functional group reactive with carbodiimide group or its particles, and reacting the resin or particles with a carbodiimide resin under heating in the presence of a solvent which dissolves the carbodiimide resin but not the thermoplastic resin or particles, to obtain the semi-hardening to hardening type reactive particles without deforming shape of the particles. More specifically, the process comprises two steps: the first step in which the base particle (A) of the thermoplastic resin having a functional group is mixed with the carbodiimide compound (B) in the presence of at least one type of solvent which dissolves (B) but not (A), to have the latter impregnated only in the surface layer section or both surface layer section and inside of the former; and the subsequent second step in which the above mixture is thermally treated. This produces the semi-hardening to hardening type reactive particles.

The first step may incorporate, as required, an adequate additive, e.g., dispersant, antioxidant, stabilizer or emulsifier, in addition to the base particle (A) and carbodiimide compound (B). The specific examples of the representative additives are described. The dispersants, stabilizers and emulsifiers useful for the process are similar to those described earlier. On the other hand, the antioxidants useful for the process include those based on phenol, sulfur, phosphorus, amine, hydroquinone and hydroxylamine. These may be used either individually or in combination.

The thermoplastic resin particles having a functional group reactive with the carbodiimide group in the carbodiimide compound (i.e., carbodiimide resin) contain the functional group preferably at 30 to 700 equivalents, more preferably 50 to 700 equivalents, still more preferably 80 to 700 equivalents. The particles containing the functional group at above 700 equivalents may have deteriorated crosslinking capacity, because of an excessive distance between the molecules. When the semi-hardened particles are to be produced, however, the functional group may be present at above 700 equivalents.

The thermoplastic resin particle having a functional group is not limited, so long as it has active hydrogen group reactive with the carbodiimide group, e.g., hydroxyl, carboxyl, amino or thiol group. The particularly preferable thermoplastic resin particles are those having carboxyl or hydroxyl group.

The thermoplastic resin particles having a functional group are preferably truly or nearly spherical. However, the non-spherical ones are acceptable.

The thermoplastic resin particles preferably have a diameter of 0.01 to 10,000 μm, more preferably 0.01 to 1,000 μm, still more preferably 0.1 to 700 μm.

Even when the thermoplastic resin is a film-shape composition, it can be crosslinkable when film thickness is in the above range. The films can be the hardening type reactive particles, and hence semi-hardened to hardened.

Content of the polycarbodiimide varies depending on the required carbodiimide group remaining after the crosslinking step. As a measure, it may be incorporated at 0.1 to 20 equivalents per equivalent of the functional group in the thermoplastic resin particle, preferably 0.5 to 8 equivalents, more preferably 1 to 6 equivalents.

Thermal treatment temperature at which the reaction mixture is heated for the reaction varies depending on type of the solvent used. However, it is in a range from 10 to 200° C., preferably 15 to 150° C., more preferably 20 to 130° C.

Crosslinking time is not limited, so long as it allows the crosslinking reaction to be almost completed. It largely varies depending on type and content of the carbodiimide resin used, type of the functional group in the resin (particle), viscosity and concentration of the solution, and so on. It is however around 1 to 24 hours at 40° C., preferably 6 to 24 hours.

The solvent which dissolves the carbodiimide resin but not the thermoplastic resin or its particles is at least one type of solvent selected from the group consisting of water and organic solvents. It may be adequately selected in consideration of type and content of the carbodiimide resin used, type of the thermoplastic resin (or particle) and type of the functional group it contains, purpose of the hardening type reactive particles, and so on.

The specific examples of the representative solvents include water; alcohols, e.g., methanol, ethanol, 1-propanol, 2-propanol, 1-butanol, 2-butanol, isobutyl alcohol, tert-butyl alcohol, 1-pentanol, 2-pentanol, 3-pentanol, 2-methyl-1-butanol, isopentyl alcohol, tert-pentyl alcohol, 1-hexanol, 2-methyl-1-pentanol, 4-methyl-2-pentanol, 2-ethyl butanol, 1-heptanol, 2-heptanol, 3-heptanol, 2-octanol, 2-ethyl-1-hexanol, benzyl alcohol and cyclohexanol; and ether alcohols, e.g., methyl cellosolve, ethyl cellosolve, isopropyl cellosolve, butyl cellosolve, and diethylene glycol monobutyl ether; ketones, e.g., acetone, methylethylketone, methylisobutylketone and cyclohexanone; esters, e.g., ethyl acetate, butyl acetate, ethyl propionate and cellosolve acetate; aliphatic or aromatic hydrocarbons, e.g., pentane, 2-methylbutane, n-hexane, cyclohexane, 2-methylpentane, 2,2-dimethylbutane, 2,3-dimethylbutane, heptane, n-octane, isooctane, 2,2,3-trimethylpentane, decane, nonane, cyclopentane, methylcyclopentane, methylcyclohexane, ethylcyclohexane, p-menthane, dicyclohexane, benzene, toluene, xylene and ethylbenzene; halogenated hydrocarbons, e.g., carbon tetrachloride, trichloroethylene, chlorobenzene and tetrabromoethane; ethers, e.g., ethyl ether, dimethyl ether, trioxane and tetrahydrofuran; acetals, e.g., methylal and diethyl acetal; fatty acids, e.g., formic, acetic and propionic acid; and sulfur- or nitrogen containing organic compounds, e.g., nitropropene, nitrobenzene, dimethyl amine, monoethanolamine, pyridine, dimethylformamide and dimethylsulfoxide. The more preferable solvents are water, lower alcohols (e.g., methanol and ethanol), a mixture of water and lower alcohol, toluene, dimethylformamide (DMF), tetrahydrofuran (THF), methylethylketone (MEK), methylisobutylketone (MIBK), acetone, N-methyl pyrrolidone (NMP), dichloromethane and tetrachloroethylene. The still more preferable ones are water, lower alcohols (e.g., methanol and ethanol), a mixture of water and lower alcohol (e.g., methanol and ethanol) and toluene. The solvent is not limited, and can be selected, as required, for a specific purpose of the polymerization process. These solvents may be used either individually or in combination.

The hardening type reactive particles are produced by mixing and reacting, under heating, a thermoplastic resin particle having a group reactive with carbodiimide group (e.g., hydroxyl, amino, carboxyl or thiol group) with a carbodiimide resin in the presence of water or an organic solvent which dissolves the carbodiimide resin but not the particle. The hardening type reactive particles show performance effects of improved resistance to heat and solvents as the crosslinked particles, and excellent glueability and adhesion as the reactive particles.

Therefore, the thermoplastic resin can be hardened, have reacted carbodiimide group inside and on the surface, and hence have improved glueability and adhesion to another substance. Moreover, use of water-soluble polycarbodiimide improves dispersibility of the particles, and allows a dye or pigment having a reactive-group to react with the carbodiimide to produce the fast color.

The hardening type reactive particles, keeping the above performances and being reactive crosslinked particles, can go into various areas, e.g., crosslinking agent, stabilizer for improving hydrolysis resistance, hardening agent for thermoplastic resins, adhesive agent, coating agent, paint, reinforcing material and aid for automobile and electric/electronic industries, and furniture and building materials. They are also applicable to spacers for liquid crystals, or the like.

In the process for producing the hardening type reactive particles, the carbodiimide resin can be bonded directly and simply to the spherical particles synthesized by emulsion, suspension or dispersion polymerization, or the like. Therefore, the resultant particles can be also used as those of core/shell structure. Moreover, they can be hardened with the carbodiimide resin solution, allowing the unreacted, residual carbodiimide resin to be reused repeatedly. These features make the process more economically advantageous.

EXAMPLES

The present invention is described in more detail by EXAMPLES and COMPARATIVE EXAMPLES, which by no means limit the present invention, wherein "part(s)" and "water" mean part(s) by weight and distilled water, respectively, unless otherwise stated.

[Synthesis of Carbodiimide Compound]

Synthesis of the carbodiimide Compounds for the present invention is described before EXAMPLES and COMPARATIVE EXAMPLES.

Synthesis Example 1

1200 g of 4,4'-dicyclohexylmethane diisocyanate (hereinafter sometimes referred to as HMDI) was reacted with 6 g of a carbodiimidation catalyst (3-methyl-1-phenyl-2-phopholene-1-oxide, which was used as the carbodiimidation catalyst in all SYNTHESIS EXAMPLES) at 180° C. for 21 hours, to produce 1027.3 g of 4.4'-dicyclohexylmethane carbodiimide resin with isocyanate group at the terminal (degree of polymerization: 6). Then, toluene was added to the above product, to produce the carbodiimide resin solution (resin concentration: 50% by weight). It contained the carbodiimide at 262 equivalents.

Synthesis Example 2

1000 g of 4,4'-dicyclohexylmethane diisocyanate (HMDI) was reacted with 106 g of cyclohexyl isocyanate in the presence of 11.1 g of the carbodiimidation catalyst at 180° C. for 36 hours, to produce 919.4 g of the carbodiimide resin with cyclohexyl group at the terminal (degree of polymerization: 10). Then, toluene was added to the above product, to produce the carbodiimide resin solution (resin concentration: 50% by weight). It contained the carbodiimide at 217 equivalents.

Synthesis Example 3

1200 g of m-tetramethylxylylene diisocyanate (hereinafter sometimes referred to as TMXDI) was reacted with 24 g of the carbodiimidation catalyst at 180° C. for 26 hours, to produce 1003.3 g of m-tetramethylxylylene carbodiimide with isocyanate group at the terminal (degree of polymerization: 10). Then, toluene was added to the above product, to produce the carbodiimide resin solution (resin concentration: 50% by weight). It contained the carbodiimide at 224 equivalents.

Synthesis Example 4

1300 g of m-tetramethylxylylene diisocyanate (TMXDI) was reacted with 26 g of the carbodiimidation catalyst at 180° C. for 40 hours, to produce 1068.5 g of m-tetramethylxylylene carbodiimide with isocyanate group at the terminal (degree of polymerization: 80). Then, toluene was added to the above product, to produce the carbodiimide resin solution (resin concentration: 50% by weight). It contained the carbodiimide at 203 equivalents.

Synthesis Example 5

1200 g of 2,6-tolylene diisocyanate (TDI) was reacted with 55.2 g of methanol at 50° C. for 1 hour, and then in the presence of 12 g of the carbodiimidation catalyst at 85° C. for 6 hours in 989.7 g of toluene, to produce the carbodiimide resin with methyl group at the terminal (degree of polymerization: 7) in the solution (resin concentration: 50% by weight). It contained the carbodiimide at 164 equivalents.

Synthesis Example 6

1000 g of 4,4'-diphenylmethane diisocyanate (hereinafter referred to as MDI) was reacted with 238 g of phenyl isocyanate in the presence of 2.5 g of the carbodiimidation catalyst at 70° C. for 5 hours in 1018 g of toluene, to produce the carbodiimide resin (degree of polymerization: 5) in the solution (resin concentration: 50% by weight). It contained the carbodiimide at 204 equivalents.

[Synthesis of Water-Soluble Carbodiimide Compound]

Synthesis Example 7

800 g of 4,4'-dicyclohexylmethane diisocyanate (HMDI) was reacted with 4 g of a carbodiimidation catalyst at 180° C. for 21 hours, to produce 4.4°-dicyclohexylmethane carbodiimide resin with isocyanate group at the terminal (degree of polymerization: 6). Next, 684.8 g of the carbodiimide resin was reacted with 488.5 g of polyoxyethylene monomethyl ether having a degree of polymerization m of 12 at 140° C. for 6 hours. Then, 782.2 g of distilled water was slowly added to the reaction effluent, to produce the light, yellowish, transparent carbodiimide resin solution (resin concentration: 60% by weight). It contained the carbodiimide at 448 equivalents.

Synthesis Example 8

800 g of m-tetramethylxylylene diisocyanate (TMXDI) was reacted with 16 g of the carbodiimidation catalyst at 180° C. for 20 hours, to produce m-tetramethylxylylene carbodiimide resin with isocyanate group at the terminal (degree of polymerization: 5). Next, 679.8 g of the resultant carbodiimide resin was reacted with 177.1 g of sodium hydroxypropanesulfonate at 100° C. for 24 hours. Then, 571.3 g of distilled water was slowly added to the reaction effluent, to produce the yellowish brown, transparent carbodiimide resin solution (resin concentration: 60% by weight). It contained the carbodiimide at 314 equivalents.

Synthesis Example 9

800 g of m-tetramethylxylylene diisocyanate (TMXDI) was reacted with 16 g of the carbodiimidation catalyst at 180° C. for 26 hours, to produce m-tetramethylxylylene carbodiimide resin with isocyanate group at the terminal (degree of polymerization: 10). Next, 668.9 g of the resultant carbodiimide resin was reacted with 333.9 g of polyoxyethylene monomethyl ether at 140° C. for 6 hours. Then, 668.5 g of distilled water was slowly added to the reaction effluent, to produce the yellowish brown, transparent carbodiimide resin solution (resin concentration: 60% by weight). It contained the carbodiimide at 336 equivalents.

Synthesis Example 10

800 g of 2,6-tolylene diisocyanate (TDI) was reacted preliminarily with 441.4 g of polyoxyethylene monomethyl ether (degree of polymerization (m): 8) at 50° C. for 1 hour, and then in the presence of the presence of 8 g of the carbodiimidation catalyst at 85° C. for 6 hours, to produce the carbodiimide resin with the sealed terminals (degree of polymerization: 7). Then, 709.6 g of distilled water was slowly added to the reaction effluent, to produce the lightly yellowish, transparent carbodiimide resin solution (resin concentration: 60% by weight). It contained the carbodiimide at 265 equivalents.

Synthesis Example 11

700 g of 2,6-tolylene diisocyanate (TDI) was reacted preliminarily with 418.4 g of polyoxyethylene monomethyl ether (degree of polymerization m: 4) at 50° C. for 1 hour, and then in the presence of the presence of 7 g of the carbodiimidation catalyst at 85° C. for 6 hours, to produce the carbodiimide resin with the sealed terminals (degree of polymerization: 3). Then, 657.1 g of distilled water was slowly added to the reaction effluent, to produce the lightly yellowish, transparent carbodiimide resin solution (resin concentration: 60% by weight). It contained the carbodiimide at 327 equivalents. The carbodiimide compounds prepared in SYNTHESIS EXAMPLES are summarized in Table 1.

TABLE 1

| Carbodiimide SYNTHESIS EXAMPLES | Diisocyanate as the starting compound | Degree of polymerization of the carbodiimide | Starting material for terminal sealing segment | NCN equivalents | Solvent |
|---|---|---|---|---|---|
| SYNTHESIS EXAMPLE 1 | HMDI | 6 | Not used (isocyanate) | 262 | Toluene |
| SYNTHESIS EXAMPLE 2 | HMDI | 10 | Cyclohexyl isocyanate | 217 | Toluene |
| SYNTHESIS EXAMPLE 3 | TMXDI | 10 | Not used (isocyanate) | 224 | Toluene |
| SYNTHESIS EXAMPLE 4 | TMXDI | 80 | Not used (isocyanate) | 203 | Toluene |
| SYNTHESIS EXAMPLE 5 | TDI | 7 | Methanol | 164 | Toluene |
| SYNTHESIS EXAMPLE 6 | MDI | 5 | Phenyl isocyanate | 204 | Toluene |
| SYNTHESIS EXAMPLE 7 | HMDI | 6 | Polyoxyethylene monomethyl ether | 448 | Water |
| SYNTHESIS EXAMPLE 8 | TMXDI | 5 | Sodium hydroxypropanesulfonate | 314 | Water |
| SYNTHESIS EXAMPLE 9 | TMXDI | 10 | Polyoxyethylene monomethyl ether | 336 | Water |
| SYNTHESIS EXAMPLE 10 | TDI | 7 | Polyoxyethylene monomethyl ether | 265 | Water |
| SYNTHESIS EXAMPLE 11 | TDI | 3 | Polyoxyethylene monomethyl ether | 327 | Water |

Particle Example 1, Prepared on a Trial Basis

Comparative Example 1

A 500 mL flask was charged with the mixture of the following composition all at once, and heated for around 18 hours in a flow of nitrogen with stirring by an agitator in an oil bath kept at 70° C.

| | |
|---|---|
| Styrene | 60.0 parts |
| Methacrylic acid | 40.0 parts |
| Methanol | 100.0 parts |
| Azobis-2-methylbutylonitrile (ABNE) | 1.0 part |

The resultant reactive polymer solution was left to cool and collected on a stainless tray. It was then dried at 60° C. for around 24 hours in a drier, to produce the resin containing carboxyl group. It was crushed and classified by known machines into the particles.

These particles had a volume-average particle diameter of 41 μm, determined by a particle size distribution analyzer (Nikkiso's Microtrack 9320HRA). They had the smallest particle diameter of 0.1 μm and largest particle diameter of 78 μm, determined by SEM analysis. These particles were named COMPARATIVE EXAMPLE 1 particles.

Particle Example 2, Prepared on a Trial Basis

Comparative Example 2

A 500 mL flask was charged with the mixture of the following composition all at once, and heated for around 18 hours in a flow of nitrogen with stirring by an agitator in an oil bath kept at 70° C.

| | |
|---|---|
| Styrene | 50.0 parts |
| Acrylic acid | 50.0 parts |
| Methanol | 100.0 parts |
| Azobis-isobutylonitrile (AIBN) | 3.0 parts |

The resultant reactive polymer solution was left to cool and collected on a stainless tray. It was then dried at 60° C. for around 24 hours in a drier, to produce the resin containing carboxyl group. It was crushed and classified by known machines into the particles.

These particles had a volume-average particle diameter of 164 μm, determined by a particle size distribution analyzer (Nikkiso's Microtrack 9320HRA). They had the smallest particle diameter of 6.5 μm and largest particle diameter of 1020 μm, determined by SEM analysis. These particles were named COMPARATIVE EXAMPLE 2 particles.

Particle Example 3, Prepared on a Trial Basis

Comparative Example 3

A 500 mL flask was charged with the mixture of the following composition all at once, and heated for around 18 hours in a flow of nitrogen with stirring by an agitator in an oil bath kept at 70° C.

| | |
|---|---|
| Methyl methacrylate | 50.0 parts |
| Acrylic acid | 50.0 parts |
| Methanol | 100.0 parts |
| Azobis-isobutylonitrile (AIBN) | 4.0 parts |

The resultant reactive polymer solution was left to cool and collected on a stainless tray. It was then dried at 60° C. for around 24 hours in a drier, to produce the resin containing carboxyl group. It was crushed and classified by known machines into the particles.

These particles had a volume-average particle diameter of 282 μm, determined by a particle size distribution analyzer (Nikkiso's Microtrack 9320HRA). They had the smallest particle diameter of 95 μm and largest particle diameter of 710 μm, determined by SEM analysis. These particles were named COMPARATIVE EXAMPLE 3 particles.

Particle Example 4, Prepared on a Trial Basis

Comparative Example 4

A 500 mL flask was charged with the mixture of the following composition all at once, and heated for around 18 hours in a flow of nitrogen with stirring by an agitator in an oil bath kept at 70° C.

| Styrene | 30.0 parts |
|---|---|
| Acrylic acid | 70.0 parts |
| Methanol | 100.0 parts |
| Azobis-isobutylonitrile (AIBN) | 2.0 parts |

The resultant reactive polymer solution was left to cool and collected on a stainless tray. It was then dried at 60° C. for around 24 hours in a drier, to produce the resin containing carboxyl group. It was crushed and classified by known machines into the particles.

These particles had a volume-average particle diameter of 73 μm, determined by a particle size distribution analyzer (Nikkiso's Microtrack 9320HRA). They had the smallest particle diameter of 6 μm and largest particle diameter of 211 μm, determined by SEM analysis. These particles were named COMPARATIVE EXAMPLE 4 particles.

Particle Example 5, Prepared on a Trial Basis

Comparative Example 5

A 500 mL flask was charged with the mixture of the following composition all at once, and heated for around 18 hours in a flow of nitrogen with stirring by an agitator in an oil bath kept at 70° C.

| Acrylic acid | 100.0 parts |
|---|---|
| Methanol | 100.0 parts |
| Azobis-isobutylonitrile (AIBN) | 3.0 parts |

The resultant reactive polymer solution was left to cool and collected on a stainless tray. It was then dried at 60° C. for around 24 hours in a drier, to produce the resin containing carboxyl group. It was crushed and classified by known machines into the particles.

These particles had a volume-average particle diameter of 24 μm, determined by a particle size distribution analyzer (Nikkiso's MICROTRACK 9320HRA). They had the smallest particle diameter of 1.1 μm and largest particle diameter of 65 μm, determined by SEM analysis. These particles were named COMPARATIVE EXAMPLE 5 particles.

Particle Example 6, Prepared on a Trial Basis

Comparative Example 6

Coarse particles of polyvinyl alcohol (Kuraray's PVA-210, partly saponified, 88% by mol) were crushed and classified by known machines into the fine particles.

These particles had a volume-average particle diameter of 48 gm, determined by a particle size distribution analyzer (Nikkiso's MICROTRACK 9320HRA). They had the smallest particle diameter of 1.2 μm and largest particle diameter of 103 μm, determined by SEM analysis. These particles were named COMPARATIVE EXAMPLE 6 particles.

Particle Example 7, Prepared on a Trial Basis

Comparative Example 7

Coarse particles of polyvinyl alcohol (Kuraray's PVA-117, totally saponified) were crushed and classified by known machines into the fine particles.

These particles had a volume-average particle diameter of 21 μm, determined by a particle size distribution analyzer (Nikkiso's MICROTRACK 9320HRA). They had the smallest particle diameter of 1.2 μm and largest particle diameter of 74 μm, determined by SEM analysis. These particles were named COMPARATIVE EXAMPLE 7 particles.

Particle Example 8, Prepared on a Trial Basis

Comparative Example 8

A 500 mL flask was charged with the mixture of the following composition all at once, and heated for around 18 hours in a flow of nitrogen with stirring by an agitator in an oil bath kept at 70° C.

| Styrene | 90.0 parts |
|---|---|
| Acrylic acid | 10.0 parts |
| THF | 100.0 parts |
| Azobis-isobutylonitrile (AIBN) | 2.0 parts |

The resultant reactive polymer solution was left to cool and collected on a stainless tray. It was then dried at 60° C. for around 24 hours in a drier, to produce the resin containing carboxyl group. It was crushed and classified by known machines into the particles.

These particles had a volume-average particle diameter of 71 μm, determined by a particle size distribution analyzer (Nikkiso's MICROTRACK 9320HRA). They had the smallest particle diameter of 4.2 μm and largest particle diameter of 229 μm, determined by SEM analysis. These particles were named COMPARATIVE EXAMPLE 8 particles.

These PARTICLE EXAMPLES 1 to 8, prepared on a trial basis, are summarized in Table 2.

TABLE 2

| | Functional group in the particle | Equivalents of the functional group | Starting compounds used |
|---|---|---|---|
| PARTICLE EXAMPLE 1 | Carboxyl | 215/COOH | Styrene and methacrylic acid |
| PARTICLE EXAMPLE 2 | Carboxyl | 144/COOH | Styrene and acrylic acid |
| PARTICLE EXAMPLE 3 | Carboxyl | 144/COOH | Methyl methacrylate and acrylic acid |
| PARTICLE EXAMPLE 4 | Carboxyl | 103/COOH | Styrene and acrylic acid |
| PARTICLE EXAMPLE 5 | Carboxyl | 72/COOH | Acrylic acid |
| PARTICLE EXAMPLE 6 | Hydroxyl | 56/OH | PVA |
| PARTICLE EXAMPLE 7 | Hydroxyl | 44/OH | PVA |
| PARTICLE EXAMPLE 8 | Carboxyl | 720/COOH | Styrene and acrylic acid |

Example 1

A 300 mL flask was charged with the mixture of the following composition all at once, and heated for around 15 hours in a flow of nitrogen with stirring by an agitator in an oil bath kept at 50° C., to prepare the carbodiimide-containing, crosslinked particle solution.

| | |
|---|---|
| PARTICLE EXAMPLE 1, prepared on a trial basis | 8.0 parts |
| Carbodiimide resin solution prepared in SYNTHESIS EXAMPLE 1 | 78.0 parts |
| Toluene | 52.0 parts |

Next, the solution was treated by around 3 to 5 cycles of washing with toluene and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 2

A 300 mL flask was charged with the mixture of the following composition all at once, and heated for around 15 hours in a flow of nitrogen with stirring by an agitator in an oil bath kept at 55° C., to prepare the carbodiimide-containing, crosslinked particle solution.

| | |
|---|---|
| PARTICLE EXAMPLE 1, prepared on a trial basis | 7.0 parts |
| Carbodiimide resin solution prepared in SYNTHESIS EXAMPLE 2 | 56.0 parts |
| Toluene | 84.0 parts |

Next, the solution was treated by around 3 to 5 cycles of washing with toluene and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 3

A 300 mL flask was charged with the mixture of the following composition all at once, and heated for around 15 hours in a flow of nitrogen with stirring by an agitator in an oil bath kept at 60° C., to prepare the carbodiimide-containing, crosslinked particle solution.

| | |
|---|---|
| PARTICLE EXAMPLE 1, prepared on a trial basis | 10.0 parts |
| Carbodiimide resin solution prepared in SYNTHESIS EXAMPLE 3 | 84.0 parts |
| Toluene | 56.0 parts |

Next, the solution was treated by around 3 to 5 cycles of washing with toluene and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 4

A 300 mL flask was charged with the mixture of the following composition all at once, and heated for around 15 hours in a flow of nitrogen with stirring by an agitator in an oil bath kept at 65° C., to prepare the carbodiimide-containing, crosslinked particle solution.

| | |
|---|---|
| PARTICLE EXAMPLE 1, prepared on a trial basis | 10.0 parts |
| Carbodiimide resin solution prepared in SYNTHESIS EXAMPLE 4 | 56.0 parts |
| Toluene | 84.0 parts |

Next, the solution was treated by around 3 to 5 cycles of washing with toluene and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 5

A 300 mL flask was charged with the mixture of the following composition all at once, and heated for around 15 hours in a flow of nitrogen with stirring by an agitator in an oil bath kept at 45° C., to prepare the carbodiimide-containing, crosslinked particle solution.

| | |
|---|---|
| PARTICLE EXAMPLE 1, prepared on a trial basis | 10.0 parts |
| Carbodiimide resin solution prepared in SYNTHESIS EXAMPLE 5 | 60.0 parts |
| Toluene | 90.0 parts |

Next, the solution was treated by around 3 to 5 cycles of washing with toluene and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 6

A 300 mL flask was charged with the mixture of the following composition all at once, and heated for around 15 hours in a flow of nitrogen with stirring by an agitator in an oil bath kept at 50° C., to prepare the carbodiimide-containing, crosslinked particle solution.

| | |
|---|---|
| PARTICLE EXAMPLE 1, prepared on a trial basis | 8.0 parts |
| Carbodiimide resin solution prepared in SYNTHESIS EXAMPLE 6 | 60.0 parts |
| Toluene | 90.0 parts |

Next, the solution was treated by around 3 to 5 cycles of washing with toluene and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 7

A 300 mL flask was charged with the mixture of the following composition all at once, and heated for around 15 hours in a flow of nitrogen with stirring by an agitator in an oil bath kept at 50° C., to prepare the carbodiimide-containing, crosslinked particle solution.

| | |
|---|---|
| PARTICLE EXAMPLE 1, prepared on a trial basis | 2.0 parts |
| Carbodiimide resin solution prepared in SYNTHESIS EXAMPLE 7 | 28.0 parts |
| Methanol | 77.0 parts |
| Water | 66.0 parts |

Next, the solution was treated by around 3 to 5 cycles of washing with a water/methanol (3/7) mixed solution and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 8

A 300 mL flask was charged with the mixture of the following composition all at once, and heated for around 15 hours in a flow of nitrogen with stirring by an agitator in an oil bath kept at 55° C., to prepare the carbodiimide-containing, crosslinked particle solution.

| | |
|---|---|
| PARTICLE EXAMPLE 1, prepared on a trial basis | 5.0 parts |
| Carbodiimide resin solution prepared in SYNTHESIS EXAMPLE 8 | 48.0 parts |
| Methanol | 58.0 parts |
| Water | 39.0 parts |

Next, the solution was treated by around 3 to 5 cycles of washing with a water/methanol (3/7) mixed solution and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 9

A 300 mL flask was charged with the mixture of the following composition all at once, and heated for around 15 hours in a flow of nitrogen with stirring by an agitator in an oil bath kept at 60° C., to prepare the carbodiimide-containing, crosslinked particle solution.

| | |
|---|---|
| PARTICLE EXAMPLE 1, prepared on a trial basis | 5.0 parts |
| Carbodiimide resin solution prepared in SYNTHESIS EXAMPLE 9 | 52.0 parts |
| Methanol | 62.0 parts |
| Water | 41.0 parts |

Next, the solution was treated by around 3 to 5 cycles of washing with a water/methanol (3/7) mixed solution and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 10

A 300 mL flask was charged with the mixture of the following composition all at once, and heated for around 15 hours in a flow of nitrogen with stirring by an agitator in an oil bath kept at 40° C., to prepare the carbodiimide-containing, crosslinked particle solution.

| | |
|---|---|
| PARTICLE EXAMPLE 1, prepared on a trial basis | 7.0 parts |
| Carbodiimide resin solution prepared in SYNTHESIS EXAMPLE 10 | 43.0 parts |
| Methanol | 52.0 parts |
| Water | 35.0 parts |

Next, the solution was treated by around 3 to 5 cycles of washing with a water/methanol (3/7) mixed solution and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 11

A 300 mL flask was charged with the mixture of the following composition all at once, and heated for around 15 hours in a flow of nitrogen with stirring by an agitator in an oil bath kept at 35° C., to prepare the carbodiimide-containing, crosslinked particle solution.

| | |
|---|---|
| PARTICLE EXAMPLE 1, prepared on a trial basis | 8.0 parts |
| Carbodiimide resin solution prepared in SYNTHESIS EXAMPLE 11 | 62.0 parts |
| Methanol | 43.0 parts |
| Water | 18.0 parts |

Next, the solution was treated by around 3 to 5 cycles of washing with a water/methanol (3/7) mixed solution and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 12

A 300 mL flask was charged with the mixture of the following composition all at once, and heated for around 15 hours in a flow of nitrogen with stirring by an agitator in an oil bath kept at 50° C., to prepare the carbodiimide-containing, crosslinked particle solution.

| | |
|---|---|
| PARTICLE EXAMPLE 2, prepared on a trial basis | 5.0 parts |
| Carbodiimide resin solution prepared in SYNTHESIS EXAMPLE 1 | 72.0 parts |
| Toluene | 48.0 parts |

Next, the solution was treated by around 3 to 5 cycles of washing with toluene and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 13

A 300 mL flask was charged with the mixture of the following composition all at once, and heated for around 15 hours in a flow of nitrogen with stirring by an agitator in an oil bath kept at 60° C., to prepare the carbodiimide-containing, crosslinked particle solution.

| | |
|---|---|
| PARTICLE EXAMPLE 2, prepared on a trial basis | 5.0 parts |
| Carbodiimide resin solution prepared in SYNTHESIS EXAMPLE 2 | 76.0 parts |
| Toluene | 114.0 parts |

Next, the solution was treated by around 3 to 5 cycles of washing with toluene and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 14

A 300 mL flask was charged with the mixture of the following composition all at once, and heated for around 15 hours in a flow of nitrogen with stirring by an agitator in an oil bath kept at 55° C., to prepare the carbodiimide-containing, crosslinked particle solution.

| | |
|---|---|
| PARTICLE EXAMPLE 2, prepared on a trial basis | 5.0 parts |
| Carbodiimide resin solution prepared in SYNTHESIS EXAMPLE 3 | 78.0 parts |
| Toluene | 52.0 parts |

Next, the solution was treated by around 3 to 5 cycles of washing with toluene and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 15

A 300 mL flask was charged with the mixture of the following composition all at once, and heated for around 15 hours in a flow of nitrogen with stirring by an agitator in an oil bath kept at 65° C., to prepare the carbodiimide-containing, crosslinked particle solution.

| | |
|---|---|
| PARTICLE EXAMPLE 2, prepared on a trial basis | 8.0 parts |
| Carbodiimide resin solution prepared in SYNTHESIS EXAMPLE 4 | 46.0 parts |
| Toluene | 69.0 parts |

Next, the solution was treated by around 3 to 5 cycles of washing with toluene and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 16

A 300 mL flask was charged with the mixture of the following composition all at once, and heated for around 15 hours in a flow of nitrogen with stirring by an agitator in an oil bath kept at 40° C., to prepare the carbodiimide-containing, crosslinked particle solution.

| | |
|---|---|
| PARTICLE EXAMPLE 2, prepared on a trial basis | 8.0 parts |
| Carbodiimide resin solution prepared in SYNTHESIS EXAMPLE 5 | 54.0 parts |
| Toluene | 81.0 parts |

Next, the solution was treated by around 3 to 5 cycles of washing with toluene and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 17

A 300 mL flask was charged with the mixture of the following composition all at once, and heated for around 15 hours in a flow of nitrogen with stirring by an agitator in an oil bath kept at 45° C., to prepare the carbodiimide-containing, crosslinked particle solution.

| | |
|---|---|
| PARTICLE EXAMPLE 2, prepared on a trial basis | 8.0 parts |
| Carbodiimide resin solution prepared in SYNTHESIS EXAMPLE 6 | 46.0 parts |
| Toluene | 69.0 parts |

Next, the solution was treated by around 3 to 5 cycles of washing with toluene and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 18

A 300 mL flask was charged with the mixture of the following composition all at once, and heated for around 15 hours in a flow of nitrogen with stirring by an agitator in an oil bath kept at 55° C., to prepare the carbodiimide-containing, crosslinked particle solution.

| | |
|---|---|
| PARTICLE EXAMPLE 2, prepared on a trial basis | 3.0 parts |
| Carbodiimide resin solution prepared in SYNTHESIS EXAMPLE 7 | 32.0 parts |
| Water | 158.0 parts |

Next, the solution was treated by around 3 to 5 cycles of washing with a water/methanol (3/7) mixed solution and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 19

A 300 mL flask was charged with the mixture of the following composition all at once, and heated for around 15 hours in a flow of nitrogen with stirring by an agitator in an oil bath kept at 60° C., to prepare the carbodiimide-containing, crosslinked particle solution.

| | |
|---|---:|
| PARTICLE EXAMPLE 2, prepared on a trial basis | 3.0 parts |
| Carbodiimide resin solution prepared in SYNTHESIS EXAMPLE 8 | 43.0 parts |
| Water | 87.0 parts |

Next, the solution was treated by around 3 to 5 cycles of washing with a water/methanol (3/7) mixed solution and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 20

A 300 mL flask was charged with the mixture of the following composition all at once, and heated for around 15 hours in a flow of nitrogen with stirring by an agitator in an oil bath kept at 65° C., to prepare the carbodiimide-containing, crosslinked particle solution.

| | |
|---|---:|
| PARTICLE EXAMPLE 2, prepared on a trial basis | 3.0 parts |
| Carbodiimide resin solution prepared in SYNTHESIS EXAMPLE 9 | 58.0 parts |
| Water | 117.0 parts |

Next, the solution was treated by around 3 to 5 cycles of washing with a water/methanol (3/7) mixed solution and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 21

A 300 mL flask was charged with the mixture of the following composition all at once, and heated for around 15 hours in a flow of nitrogen with stirring by an agitator in an oil bath kept at 30° C., to prepare the carbodiimide-containing, crosslinked particle solution.

| | |
|---|---:|
| PARTICLE EXAMPLE 2, prepared on a trial basis | 5.0 parts |
| Carbodiimide resin solution prepared in SYNTHESIS EXAMPLE 10 | 62.0 parts |
| Water | 61.0 parts |

Next, the solution was treated by around 3 to 5 cycles of washing with a water/methanol (3/7) mixed solution and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 22

A 300 mL flask was charged with the mixture of the following composition all at once, and heated for around 15 hours in a flow of nitrogen with stirring by an agitator in an oil bath kept at 25° C., to prepare the carbodiimide-containing, crosslinked particle solution.

| | |
|---|---:|
| PARTICLE EXAMPLE 2, prepared on a trial basis | 5.0 parts |
| Carbodiimide resin solution prepared in SYNTHESIS EXAMPLE 11 | 95.0 parts |
| Water | 48.0 parts |

Next, the solution was treated by around 3 to 5 cycles of washing with a water/methanol (3/7) mixed solution and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 23

A 300 mL flask was charged with the mixture of the following composition all at once, and heated for around 15 hours in a flow of nitrogen with stirring by an agitator in an oil bath kept at 60° C., to prepare the carbodiimide-containing, crosslinked particle solution.

| | |
|---|---:|
| PARTICLE EXAMPLE 3, prepared on a trial basis | 4.0 parts |
| Carbodiimide resin solution prepared in SYNTHESIS EXAMPLE 1 | 72.0 parts |
| Toluene | 48.0 parts |

Next, the solution was treated by around 3 to 5 cycles of washing with toluene and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 24

A 300 mL flask was charged with the mixture of the following composition all at once, and heated for around 15 hours in a flow of nitrogen with stirring by an agitator in an oil bath kept at 70° C., to prepare the carbodiimide-containing, crosslinked particle solution.

| | |
|---|---:|
| PARTICLE EXAMPLE 3, prepared on a trial basis | 5.0 parts |
| Carbodiimide resin solution prepared in SYNTHESIS EXAMPLE 4 | 84.0 parts |
| Toluene | 56.0 parts |

Next, the solution was treated by around 3 to 5 cycles of washing with toluene and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 25

A 300 mL flask was charged with the mixture of the following composition all at once, and heated for around 15 hours in a flow of nitrogen with stirring by an agitator in an oil bath kept at 50° C., to prepare the carbodiimide-containing, crosslinked particle solution.

| | |
|---|---|
| PARTICLE EXAMPLE 3, prepared on a trial basis | 5.0 parts |
| Carbodiimide resin solution prepared in SYNTHESIS EXAMPLE 6 | 70.0 parts |
| Toluene | 105.0 parts |

Next, the solution was treated by around 3 to 5 cycles of washing with toluene and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 26

A 300 mL flask was charged with the mixture of the following composition all at once, and heated for around 15 hours in a flow of nitrogen with stirring by an agitator in an oil bath kept at 45° C., to prepare the carbodiimide-containing, crosslinked particle solution.

| | |
|---|---|
| PARTICLE EXAMPLE 3, prepared on a trial basis | 2.0 parts |
| Carbodiimide resin solution prepared in SYNTHESIS EXAMPLE 7 | 52.0 parts |
| Water | 103.0 parts |

Next, the solution was treated by around 3 to 5 cycles of washing with a water/methanol (3/7) mixed solution and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 27

A 300 mL flask was charged with the mixture of the following composition all at once, and heated for around 15 hours in a flow of nitrogen with stirring by an agitator in an oil bath kept at 20° C., to prepare the carbodiimide-containing, crosslinked particle solution.

| | |
|---|---|
| PARTICLE EXAMPLE 3, prepared on a trial basis | 5.0 parts |
| Carbodiimide resin solution prepared in SYNTHESIS EXAMPLE 10 | 62.0 parts |
| Water | 61.0 parts |

Next, the solution was treated by around 3 to 5 cycles of washing with a water/methanol (3/7) mixed solution and filtration by a vacuum filtration unit, and dried under a vacuum to prepare the cross linked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 28

A 300 mL flask was charged with the mixture of the following composition all at once, and heated for around 15 hours in a flow of nitrogen with stirring by an agitator in an oil bath kept at 60° C., to prepare the carbodiimide-containing, crosslinked particle solution.

| | |
|---|---|
| PARTICLE EXAMPLE 4, prepared on a trial basis | 3.0 parts |
| Carbodiimide resin solution prepared in SYNTHESIS EXAMPLE 1 | 122.0 parts |
| Toluene | 81.0 parts |

Next, the solution was treated by around 3 to 5 cycles of washing with toluene and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 29

A 300 mL flask was charged with the mixture of the following composition all at once, and heated for around 15 hours in a flow of nitrogen with stirring by an agitator in an oil bath kept at 65° C., to prepare the carbodiimide-containing, crosslinked particle solution.

| | |
|---|---|
| PARTICLE EXAMPLE 4, prepared on a trial basis | 4.0 parts |
| Carbodiimide resin solution prepared in SYNTHESIS EXAMPLE 4 | 78.0 parts |
| Toluene | 52.0 parts |

Next, the solution was treated by around 3 to 5 cycles of washing with toluene and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 30

A 300 mL flask was charged with the mixture of the following composition all at once, and heated for around 15 hours in a flow of nitrogen with stirring by an agitator in an oil bath kept at 50° C., to prepare the carbodiimide-containing, crosslinked particle solution.

| | |
|---|---|
| PARTICLE EXAMPLE 4, prepared on a trial basis | 4.0 parts |
| Carbodiimide resin solution prepared in SYNTHESIS EXAMPLE 6 | 80.0 parts |
| Toluene | 120.0 parts |

Next, the solution was treated by around 3 to 5 cycles of washing with toluene and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 31

A 300 mL flask was charged with the mixture of the following composition all at once, and heated for around 15 hours in a flow of nitrogen with stirring by an agitator in an oil bath kept at 50° C., to prepare the carbodiimide-containing, crosslinked particle solution.

| PARTICLE EXAMPLE 4, prepared on a trial basis | 2.0 parts |
|---|---|
| Carbodiimide resin solution prepared in SYNTHESIS EXAMPLE 7 | 72.0 parts |
| Water | 143.0 parts |

Next, the solution was treated by around 3 to 5 cycles of washing with a water/methanol (3/7) mixed solution and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 32

A 300 mL flask was charged with the mixture of the following composition all at once, and heated for around 15 hours in a flow of nitrogen with stirring by an agitator in an oil bath kept at 40° C., to prepare the carbodiimide-containing, crosslinked particle solution.

| PARTICLE EXAMPLE 4, prepared on a trial basis | 4.0 parts |
|---|---|
| Carbodiimide resin solution prepared in SYNTHESIS EXAMPLE 10 | 85.0 parts |
| Water | 85.0 parts |

Next, the solution was treated by around 3 to 5 cycles of washing with a water/methanol (3/7) mixed solution and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 33

A 300 mL flask was charged with the mixture of the following composition all at once, and heated for around 15 hours in a flow of nitrogen with stirring by an agitator in an oil bath kept at 55° C., to prepare the carbodiimide-containing, crosslinked particle solution.

| PARTICLE EXAMPLE 5, prepared on a trial basis | 2.0 parts |
|---|---|
| Carbodiimide resin solution prepared in SYNTHESIS EXAMPLE 2 | 84.0 parts |
| Toluene | 126.0 parts |

Next, the solution was treated by around 3 to 5 cycles of washing with toluene and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 34

A 300 mL flask was charged with the mixture of the following composition all at once, and heated for around 15 hours in a flow of nitrogen with stirring by an agitator in an oil bath kept at 65° C., to prepare the carbodiimide-containing, crosslinked particle solution.

| PARTICLE EXAMPLE 5, prepared on a trial basis | 2.0 parts |
|---|---|
| Carbodiimide resin solution prepared in SYNTHESIS EXAMPLE 3 | 124.0 parts |
| Toluene | 83.0 parts |

Next, the solution was treated by around 3 to 5 cycles of washing with toluene and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 35

A 300 mL flask was charged with the mixture of the following composition all at once, and heated for around 15 hours in a flow of nitrogen with stirring by an agitator in an oil bath kept at 50° C., to prepare the carbodiimide-containing, crosslinked particle solution.

| PARTICLE EXAMPLE 5, prepared on a trial basis | 3.0 parts |
|---|---|
| Carbodiimide resin solution prepared in SYNTHESIS EXAMPLE 5 | 109.0 parts |
| Toluene | 73.0 parts |

Next, the solution was treated by around 3 to 5 cycles of washing with a water/methanol (3/7) mixed solution and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 36

A 300 mL flask was charged with the mixture of the following composition all at once, and heated for around 15 hours in a flow of nitrogen with stirring by an agitator in an oil bath kept at 50° C., to prepare the carbodiimide-containing, crosslinked particle solution.

| PARTICLE EXAMPLE 5, prepared on a trial basis | 2.0 parts |
|---|---|
| Carbodiimide resin solution prepared in SYNTHESIS EXAMPLE 6 | 68.0 parts |
| Toluene | 102.0 parts |

Next, the solution was treated by around 3 to 5 cycles of washing with a water/methanol (3/7) mixed solution and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 37

A 300 mL flask was charged with the mixture of the following composition all at once, and heated for around 15 hours in a flow of nitrogen with stirring by an agitator in an oil bath kept at 105° C., to prepare the carbodiimide-containing, crosslinked particle solution.

| | |
|---|---|
| PARTICLE EXAMPLE 6, prepared on a trial basis | 2.0 parts |
| Carbodiimide resin solution prepared in SYNTHESIS EXAMPLE 1 | 112.0 parts |
| Toluene | 75.0 parts |

Next, the solution was treated by around 3 to 5 cycles of washing with toluene and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 38

A 300 mL flask was charged with the mixture of the following composition all at once, and heated for around 15 hours in a flow of nitrogen with stirring by an agitator in an oil bath kept at 110° C., to prepare the carbodiimide-containing, crosslinked particle solution.

| | |
|---|---|
| PARTICLE EXAMPLE 6, prepared on a trial basis | 2.0 parts |
| Carbodiimide resin solution prepared in SYNTHESIS EXAMPLE 3 | 128.0 parts |
| Toluene | 85.0 parts |

Next, the solution was treated by around 3 to 5 cycles of washing with toluene and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 39

A 300 mL flask was charged with the mixture of the following composition all at once, and heated for around 15 hours in a flow of nitrogen with stirring by an agitator in an oil bath kept at 100° C., to prepare the carbodiimide-containing, crosslinked particle solution.

| | |
|---|---|
| PARTICLE EXAMPLE 6, prepared on a trial basis | 2.0 parts |
| Carbodiimide resin solution prepared in SYNTHESIS EXAMPLE 5 | 94.0 parts |
| Toluene | 63.0 parts |

Next, the solution was treated by around 3 to 5 cycles of washing with toluene and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 40

A 300 mL flask was charged with the mixture of the following composition all at once, and heated for around 15 hours in a flow of nitrogen with stirring by an agitator in an oil bath kept at 100° C., to prepare the carbodiimide-containing, crosslinked particle solution.

| | |
|---|---|
| PARTICLE EXAMPLE 7, prepared on a trial basis | 3.0 parts |
| Carbodiimide resin solution prepared in SYNTHESIS EXAMPLE 5 | 134.0 parts |
| Toluene | 89.0 parts |

Next, the solution was treated by around 3 to 5 cycles of washing with toluene and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Example 41

A 300 mL flask was charged with the mixture of the following composition all at once, and heated for around 15 hours in a flow of nitrogen with stirring by an agitator in an oil bath kept at 95° C., to prepare the carbodiimide-containing, crosslinked particle solution.

| | |
|---|---|
| PARTICLE EXAMPLE 7, prepared on a trial basis | 2.0 parts |
| Carbodiimide resin solution prepared in SYNTHESIS EXAMPLE 6 | 112.0 parts |
| Toluene | 112.0 parts |

Next, the solution was treated by around 3 to 5 cycles of washing with toluene and filtration by a vacuum filtration unit, and dried under a vacuum to prepare the crosslinked particles. These particles showed an absorption band peak assigned to carbodiimide group at a wavelength of around 2150 (1/cm), determined by a Fourier transform infrared spectrometer (Shimadzu Corp.'s FT-IR8200PC).

Comparative Example 9

A 300 mL flask was charged with the mixture of the following composition all at once. However, PARTICLE EXAMPLE 8 was dissolved in toluene.

| | |
|---|---|
| PARTICLE EXAMPLE 8, prepared on a trial basis | 8.0 parts |
| Carbodiimide resin solution prepared in SYNTHESIS EXAMPLE 1 | 30.0 parts |
| Toluene | 120.0 parts |

Comparative Example 10

A 300 mL flask was charged with the mixture of the following composition all at once. However, PARTICLE EXAMPLE 8 was dissolved in toluene.

| | |
|---|---|
| PARTICLE EXAMPLE 8, prepared on a trial basis | 8.0 parts |
| Carbodiimide resin solution prepared in SYNTHESIS EXAMPLE 2 | 24.0 parts |
| Toluene | 96.0 parts |

Comparative Example 11

A 300 mL flask was charged with the mixture of the following composition all at once. However, PARTICLE EXAMPLE 8 was dissolved in toluene.

| PARTICLE EXAMPLE 8, prepared on a trial basis | 8.0 parts |
| Carbodiimide resin solution prepared in SYNTHESIS EXAMPLE 3 | 24.0 parts |
| Toluene | 96.0 parts |

Comparative Example 12

A 300 mL flask was charged with the mixture of the following composition all at once. However, PARTICLE EXAMPLE 8 was dissolved in toluene.

| PARTICLE EXAMPLE 8, prepared on a trial basis | 10.0 parts |
| Carbodiimide resin solution prepared in SYNTHESIS EXAMPLE 4 | 22.0 parts |
| Toluene | 88.0 parts |

Comparative Example 13

A 300 mL flask was charged with the mixture of the following composition all at once. However, PARTICLE EXAMPLE 8 was dissolved in toluene.

| PARTICLE EXAMPLE 8, prepared on a trial basis | 10.0 parts |
| Carbodiimide resin solution prepared in SYNTHESIS EXAMPLE 5 | 22.0 parts |
| Toluene | 88.0 parts |

Comparative Example 14

A 300 mL flask was charged with the mixture of the following composition all at once. However, PARTICLE EXAMPLE 8 was dissolved in toluene.

| PARTICLE EXAMPLE 8, prepared on a trial basis | 10.0 parts |
| Carbodiimide resin solution prepared in SYNTHESIS EXAMPLE 6 | 22.0 parts |
| Toluene | 88.0 parts |

Comparative Example 15

A 300 mL flask was charged with the mixture of the following composition all at once, and heated for around 15 hours in a flow of nitrogen with stirring by an agitator in an oil bath kept at 60° C., to prepare the carbodiimide-containing, crosslinked particle solution.

| PARTICLE EXAMPLE 8, prepared on a trial basis | 6.0 parts |
| Carbodiimide resin solution prepared in SYNTHESIS EXAMPLE 7 | 25.0 parts |
| Methanol | 95.0 parts |
| Water | 31.0 parts |

Next, the solution was treated by around 3 to 5 cycles of washing with a water/methanol (3/7) mixed solution and filtration by a vacuum filtration unit, and dried under a vacuum to prepare the crosslinked particles. These particles showed a trace quantity of absorption band peak assigned to carbodiimide group at a wavelength of around 2150 (1/cm), determined by a Fourier transform infrared spectrometer (Shimadzu Corp.'s FT-IR8200PC).

Comparative Example 16

A 300 mL flask was charged with the mixture of the following composition all at once, and heated for around 15 hours in a flow of nitrogen with stirring by an agitator in an oil bath kept at 60° C., to prepare the carbodiimide-containing, crosslinked particle solution.

| PARTICLE EXAMPLE 8, prepared on a trial basis | 8.0 parts |
| Carbodiimide resin solution prepared in SYNTHESIS EXAMPLE 8 | 23.0 parts |
| Methanol | 88.0 parts |
| Water | 29.0 parts |

Next, the solution was treated by around 3 to 5 cycles of washing with a water/methanol (3/7) mixed solution and filtration by a vacuum filtration unit, and dried under a vacuum to prepare the crosslinked particles. These particles showed a trace quantity of absorption band peak assigned to carbodiimide group at a wavelength of around 2150 (1/cm), determined by a Fourier transform infrared spectrometer (Shimadzu Corp.'s FT-IR8200PC).

Comparative Example 17

A 300 mL flask was charged with the mixture of the following composition all at once, and heated for around 15 hours in a flow of nitrogen with stirring by an agitator in an oil bath kept at 65° C., to prepare the carbodiimide-containing, crosslinked particle solution.

| PARTICLE EXAMPLE 8, prepared on a trial basis | 8.0 parts |
| Carbodiimide resin solution prepared in SYNTHESIS EXAMPLE 9 | 25.0 parts |
| Methanol | 95.0 parts |
| Water | 31.0 parts |

Next, the solution was treated by around 3 to 5 cycles of washing with a water/methanol (3/7) mixed solution and filtration by a vacuum filtration unit, and dried under a vacuum to prepare the crosslinked particles. These particles showed a trace quantity of absorption band peak assigned to carbodiimide group at a wavelength of around 2150 (1/cm), determined by a Fourier transform infrared spectrometer (Shimadzu Corp.'s FT-IR8200PC).

Comparative Example 18

A 300 mL flask was charged with the mixture of the following composition all at once, and heated for around 15 hours in a flow of nitrogen with stirring by an agitator in an oil bath kept at 35° C., to prepare the carbodiimide-containing, crosslinked particle solution.

| PARTICLE EXAMPLE 8, prepared on a trial basis | 10.0 parts |
| Carbodiimide resin solution prepared in SYNTHESIS EXAMPLE 10 | 25.0 parts |
| Methanol | 95.0 parts |
| Water | 31.0 parts |

Next, the solution was treated by around 3 to 5 cycles of washing with a water/methanol (3/7) mixed solution and filtration by a vacuum filtration unit, and dried under a vacuum to prepare the crosslinked particles. These particles showed a trace quantity of absorption band peak assigned to carbodiimide group at a wavelength of around 2150 (1/cm), determined by a Fourier transform infrared spectrometer (Shimadzu Corp.'s FT-IR8200PC).

Comparative Example 19

A 300 mL flask was charged with the mixture of the following composition all at once, and heated for around 15 hours in a flow of nitrogen with stirring by an agitator in an oil bath kept at 30° C., to prepare the carbodiimide-containing, crosslinked particle solution.

| | |
|---|---|
| PARTICLE EXAMPLE 8, prepared on a trial basis | 8.0 parts |
| Carbodiimide resin solution prepared in SYNTHESIS EXAMPLE 11 | 25.0 parts |
| Methanol | 95.0 parts |
| Water | 31.0 parts |

Next, the solution was treated by around 3 to 5 cycles of washing with a water/methanol (3/7) mixed solution and filtration by a vacuum filtration unit, and dried under a vacuum to prepare the crosslinked particles. These particles showed a trace quantity of absorption band peak assigned to carbodiimide group at a wavelength of around 2150 (1/cm), determined by a Fourier transform infrared spectrometer (Shimadzu Corp.'s FT-IR8200PC).

EXAMPLES 1 to 41 are summarized in Table 3, and COMPARATIVE EXAMPLES 1 to 19 in Table 4.

TABLE 3

| EXAMPLES | Starting diisocyanate compound for carbodiimidation | Content of carbodiimide (equivalents), (NCN/functional group) | Reaction temperature (° C.) | Solvents | Solution concentration (% by weight) (Total solution − Solvent)/Total solution × 100 |
|---|---|---|---|---|---|
| 1 | HMDI | 4 | 50 | Toluene | 34.1 |
| 2 | HMDI | 4 | 55 | Toluene | 23.8 |
| 3 | TMXDI | 4 | 60 | Toluene | 34.7 |
| 4 | TMXDI | 3 | 65 | Toluene | 25.3 |
| 5 | TDI | 4 | 45 | Toluene | 25.0 |
| 6 | MDI | 4 | 50 | Toluene | 24.1 |
| 7 | HMDI | 4 | 50 | Water/methanol, mixture | 11 |
| 8 | TMXDI | 4 | 55 | Water/methanol, mixture | 22.7 |
| 9 | TMXDI | 4 | 60 | Water/methanol, mixture | 22.5 |
| 10 | TDI | 3 | 40 | Water/methanol, mixture | 24.1 |
| 11 | TDI | 3 | 35 | Water/methanol, mixture | 34.4 |
| 12 | HMDI | 4 | 50 | Toluene | 32.8 |
| 13 | HMDI | 5 | 60 | Toluene | 22.1 |
| 14 | TMXDI | 5 | 55 | Toluene | 32.6 |
| 15 | TMXDI | 2 | 65 | Toluene | 25.2 |
| 16 | TDI | 3 | 40 | Toluene | 24.5 |
| 17 | MDI | 2 | 45 | Toluene | 25.2 |
| 18 | HMDI | 2 | 55 | Water | 11.4 |
| 19 | TMXDI | 4 | 60 | Water | 21.8 |
| 20 | TMXDI | 5 | 65 | Water | 21.3 |
| 21 | TDI | 4 | 30 | Water | 32.8 |
| 22 | TDI | 5 | 25 | Water | 41.9 |
| 23 | HMDI | 5 | 60 | Toluene | 32.3 |
| 24 | TMXDI | 6 | 70 | Toluene | 32.4 |
| 25 | MDI | 5 | 50 | Toluene | 22.2 |
| 26 | HMDI | 5 | 45 | Water | 21 |
| 27 | TDI | 4 | 20 | Water | 32.8 |
| 28 | HMDI | 8 | 60 | Toluene | 31.1 |
| 29 | TMXDI | 5 | 65 | Toluene | 32.1 |
| 30 | MDI | 5 | 50 | Toluene | 21.6 |
| 31 | HMDI | 5 | 50 | Water | 20.7 |
| 32 | TDI | 5 | 40 | Water | 31.6 |
| 33 | HMDI | 7 | 55 | Toluene | 20.8 |
| 34 | TMXDI | 10 | 65 | Toluene | 30.6 |
| 35 | TDI | 8 | 50 | Toluene | 31.1 |
| 36 | MDI | 6 | 50 | Toluene | 20.9 |
| 37 | HMDI | 6 | 105 | Toluene | 30.7 |
| 38 | TMXDI | 8 | 110 | Toluene | 30.7 |
| 39 | TDI | 6 | 100 | Toluene | 30.8 |
| 40 | TDI | 6 | 100 | Toluene | 31 |
| 41 | MDI | 6 | 95 | Toluene | 25.7 |

TABLE 4

| COMPARATIVE EXAMPLES | Starting diisocyanate compound for carbodiimidation | Content of carbodiimide (equivalents), (NCN/functional group) | Reaction temperature (° C.) | Solvents | Solution concentration (% by weight) (Total solution − Solvent)/Total solution × 100 |
|---|---|---|---|---|---|
| 1 | No carbodiimide was contained in the particle | — | — | — |
| 2 | | | | | |
| 3 | | | | | |
| 4 | | | | | |
| 5 | | | | | |
| 6 | | | | | |
| 7 | | | | | |
| 8 | | | | | |
| 9 | HMDI | 5 | — | Toluene | 14.6 |
| 10 | HMDI | 5 | | Toluene | 15.6 |
| 11 | TMXDI | 5 | | Toluene | 15.6 |
| 12 | TMXDI | 4 | | Toluene | 17.5 |
| 13 | TDI | 5 | | Toluene | 17.5 |
| 14 | MDI | 4 | | Toluene | 17.5 |
| 15 | HMDI | 4 | 60 | Water/methanol, mixture | 13.4 |
| 16 | TMXDI | 4 | 60 | Water/methanol, mixture | 14.9 |
| 17 | TMXDI | 4 | 65 | Water/methanol, mixture | 14.5 |
| 18 | TDI | 4 | 35 | Water/methanol, mixture | 15.5 |
| 19 | TDI | 4 | 30 | Water/methanol, mixture | 14.5 |

(Evaluation Test 1

A 300 mL flask was charged with 1 g of the particles prepared in each of EXAMPLES 1 to 41 and COMPARATIVE EXAMPLES 1 to 19, water and 100 mL of an organic solvent described in Table 5 or 6. Each of the resultant mixtures was stirred at normal temperature for 30 minutes. Then, it was visually observed to confirm its resistance to solvents, and also analyzed by an SEM (Hitachi's S-2150) to confirm the particle shape. The evaluation results are given in Tables 5 and 6.

TABLE 5

| | Solvents | | | | | | | | | |
|---|---|---|---|---|---|---|---|---|---|---|
| | Water | | Methanol | | Ethanol | | Toluene | | DMF | |
| Test 1 | Visual observation | SEM analysis | Visual observation | SEM analysis | Visual observation | SEM analysis | Visual observation | SEM analysis | Visual observation | SEM analysis |
| EXAMPLE 1 | ○ | 1 | ○ | 1 | ○ | 1 | ○ | 1 | ○ | 1 |
| 2 | ○ | 1 | ○ | 1 | ○ | 1 | ○ | 1 | ○ | 1 |
| 3 | ○ | 1 | ○ | 1 | ○ | 1 | ○ | 1 | ○ | 1 |
| 4 | ○ | 1 | ○ | 1 | ○ | 1 | ○ | 1 | ○ | 1 |
| 5 | ○ | 1 | ○ | 1 | ○ | 1 | ○ | 1 | ○ | 1 |
| 6 | ○ | 1 | ○ | 1 | ○ | 1 | ○ | 1 | ○ | 1 |
| 7 | ○ | 1 | ○ | 1 | ○ | 1 | ○ | 1 | ○ | 1 |
| 8 | ○ | 1 | ○ | 1 | ○ | 1 | ○ | 1 | ○ | 1 |
| 9 | ○ | 1 | ○ | 1 | ○ | 1 | ○ | 1 | ○ | 1 |
| 10 | ○ | 1 | ○ | 1 | ○ | 1 | ○ | 1 | ○ | 1 |
| 11 | ○ | 1 | ○ | 1 | ○ | 1 | ○ | 1 | ○ | 1 |
| 12 | ○ | 1 | ○ | 1 | ○ | 1 | ○ | 1 | ○ | 1 |
| 13 | ○ | 1 | ○ | 1 | ○ | 1 | ○ | 1 | ○ | 1 |
| 14 | ○ | 1 | ○ | 1 | ○ | 1 | ○ | 1 | ○ | 1 |
| 15 | ○ | 1 | ○ | 1 | ○ | 1 | ○ | 1 | ○ | 1 |
| 16 | ○ | 1 | ○ | 1 | ○ | 1 | ○ | 1 | ○ | 1 |
| 17 | ○ | 1 | ○ | 1 | ○ | 1 | ○ | 1 | ○ | 1 |
| 18 | ○ | 1 | ○ | 1 | ○ | 1 | ○ | 1 | ○ | 1 |
| 19 | ○ | 1 | ○ | 1 | ○ | 1 | ○ | 1 | ○ | 1 |
| 20 | ○ | 1 | ○ | 1 | ○ | 1 | ○ | 1 | ○ | 1 |
| 21 | ○ | 1 | ○ | 1 | ○ | 1 | ○ | 1 | ○ | 1 |
| 22 | ○ | 1 | ○ | 1 | ○ | 1 | ○ | 1 | ○ | 1 |
| 23 | ○ | 1 | ○ | 1 | ○ | 1 | ○ | 1 | ○ | 1 |
| 24 | ○ | 1 | ○ | 1 | ○ | 1 | ○ | 1 | ○ | 1 |
| 25 | ○ | 1 | ○ | 1 | ○ | 1 | ○ | 1 | ○ | 1 |
| 26 | ○ | 1 | ○ | 1 | ○ | 1 | ○ | 1 | ○ | 1 |
| 27 | ○ | 1 | ○ | 1 | ○ | 1 | ○ | 1 | ○ | 1 |
| 28 | ○ | 1 | ○ | 1 | ○ | 1 | ○ | 1 | ○ | 1 |

TABLE 5-continued

| | | | | | | | | | | |
|---|---|---|---|---|---|---|---|---|---|---|
| 29 | ○ | 1 | ○ | 1 | ○ | 1 | ○ | 1 | ○ | 1 |
| 30 | ○ | 1 | ○ | 1 | ○ | 1 | ○ | 1 | ○ | 1 |
| 31 | ○ | 1 | ○ | 1 | ○ | 1 | ○ | 1 | ○ | 1 |
| 32 | ○ | 1 | ○ | 1 | ○ | 1 | ○ | 1 | ○ | 1 |
| 33 | ○ | 1 | ○ | 1 | ○ | 1 | ○ | 1 | ○ | 1 |
| 34 | ○ | 1 | ○ | 1 | ○ | 1 | ○ | 1 | ○ | 1 |
| 35 | ○ | 1 | ○ | 1 | ○ | 1 | ○ | 1 | ○ | 1 |
| 36 | ○ | 1 | ○ | 1 | ○ | 1 | ○ | 1 | ○ | 1 |
| 37 | ○ | 1 | ○ | 1 | ○ | 1 | ○ | 1 | ○ | 1 |
| 38 | ○ | 1 | ○ | 1 | ○ | 1 | ○ | 1 | ○ | 1 |
| 39 | ○ | 1 | ○ | 1 | ○ | 1 | ○ | 1 | ○ | 1 |
| 40 | ○ | 1 | ○ | 1 | ○ | 1 | ○ | 1 | ○ | 1 |
| EXAMPLE 41 | ○ | 1 | ○ | 1 | ○ | 1 | ○ | 1 | ○ | 1 |

| | Solvents | | | | | | | | | |
|---|---|---|---|---|---|---|---|---|---|---|
| | THF | | MEK | | NMP | | Acetone | | Dichloromethane | |
| Test 1 | Visual observation | SEM analysis | Visual observation | SEM analysis | Visual observation | SEM analysis | Visual observation | SEM analysis | Visual observation | SEM analysis |
| EXAMPLE 1 | ○ | 1 | ○ | 1 | ○ | 1 | ○ | 1 | ○ | 1 |
| 2 | ○ | 1 | ○ | 1 | ○ | 1 | ○ | 1 | ○ | 1 |
| 3 | ○ | 1 | ○ | 1 | ○ | 1 | ○ | 1 | ○ | 1 |
| 4 | ○ | 1 | ○ | 1 | ○ | 1 | ○ | 1 | ○ | 1 |
| 5 | ○ | 1 | ○ | 1 | ○ | 1 | ○ | 1 | ○ | 1 |
| 6 | ○ | 1 | ○ | 1 | ○ | 1 | ○ | 1 | ○ | 1 |
| 7 | ○ | 1 | ○ | 1 | ○ | 1 | ○ | 1 | ○ | 1 |
| 8 | ○ | 1 | ○ | 1 | ○ | 1 | ○ | 1 | ○ | 1 |
| 9 | ○ | 1 | ○ | 1 | ○ | 1 | ○ | 1 | ○ | 1 |
| 10 | ○ | 1 | ○ | 1 | ○ | 1 | ○ | 1 | ○ | 1 |
| 11 | ○ | 1 | ○ | 1 | ○ | 1 | ○ | 1 | ○ | 1 |
| 12 | ○ | 1 | ○ | 1 | ○ | 1 | ○ | 1 | ○ | 1 |
| 13 | ○ | 1 | ○ | 1 | ○ | 1 | ○ | 1 | ○ | 1 |
| 14 | ○ | 1 | ○ | 1 | ○ | 1 | ○ | 1 | ○ | 1 |
| 15 | ○ | 1 | ○ | 1 | ○ | 1 | ○ | 1 | ○ | 1 |
| 16 | ○ | 1 | ○ | 1 | ○ | 1 | ○ | 1 | ○ | 1 |
| 17 | ○ | 1 | ○ | 1 | ○ | 1 | ○ | 1 | ○ | 1 |
| 18 | ○ | 1 | ○ | 1 | ○ | 1 | ○ | 1 | ○ | 1 |
| 19 | ○ | 1 | ○ | 1 | ○ | 1 | ○ | 1 | ○ | 1 |
| 20 | ○ | 1 | ○ | 1 | ○ | 1 | ○ | 1 | ○ | 1 |
| 21 | ○ | 1 | ○ | 1 | ○ | 1 | ○ | 1 | ○ | 1 |
| 22 | ○ | 1 | ○ | 1 | ○ | 1 | ○ | 1 | ○ | 1 |
| 23 | ○ | 1 | ○ | 1 | ○ | 1 | ○ | 1 | ○ | 1 |
| 24 | ○ | 1 | ○ | 1 | ○ | 1 | ○ | 1 | ○ | 1 |
| 25 | ○ | 1 | ○ | 1 | ○ | 1 | ○ | 1 | ○ | 1 |
| 26 | ○ | 1 | ○ | 1 | ○ | 1 | ○ | 1 | ○ | 1 |
| 27 | ○ | 1 | ○ | 1 | ○ | 1 | ○ | 1 | ○ | 1 |
| 28 | ○ | 1 | ○ | 1 | ○ | 1 | ○ | 1 | ○ | 1 |
| 29 | ○ | 1 | ○ | 1 | ○ | 1 | ○ | 1 | ○ | 1 |
| 30 | ○ | 1 | ○ | 1 | ○ | 1 | ○ | 1 | ○ | 1 |
| 31 | ○ | 1 | ○ | 1 | ○ | 1 | ○ | 1 | ○ | 1 |
| 32 | ○ | 1 | ○ | 1 | ○ | 1 | ○ | 1 | ○ | 1 |
| 33 | ○ | 1 | ○ | 1 | ○ | 1 | ○ | 1 | ○ | 1 |
| 34 | ○ | 1 | ○ | 1 | ○ | 1 | ○ | 1 | ○ | 1 |
| 35 | ○ | 1 | ○ | 1 | ○ | 1 | ○ | 1 | ○ | 1 |
| 36 | ○ | 1 | ○ | 1 | ○ | 1 | ○ | 1 | ○ | 1 |
| 37 | ○ | 1 | ○ | 1 | ○ | 1 | ○ | 1 | ○ | 1 |
| 38 | ○ | 1 | ○ | 1 | ○ | 1 | ○ | 1 | ○ | 1 |
| 39 | ○ | 1 | ○ | 1 | ○ | 1 | ○ | 1 | ○ | 1 |
| 40 | ○ | 1 | ○ | 1 | ○ | 1 | ○ | 1 | ○ | 1 |
| EXAMPLE 41 | ○ | 1 | ○ | 1 | ○ | 1 | ○ | 1 | ○ | 1 |

○: Dispersed
Δ: Partly dispersed
x: Dissolved
1: Particle retaining shape of the base particle
0: Particle no longer retaining shape of the base particle
F: Particle dissolved before it was synthesized

TABLE 6

| Test 1 | Solvents | | | | | | | | | |
|---|---|---|---|---|---|---|---|---|---|---|
| | Water | | Methanol | | Ethanol | | Toluene | | DMF | |
| | Visual observation | SEM analysis | Visual observation | SEM analysis | Visual observation | SEM analysis | Visual observation | SEM analysis | Visual observation | SEM analysis |
| COMPARATIVE EXAMPLE 1 | ○ | 1 | x | 0 | x | 0 | ○ | 1 | x | 0 |
| 2 | ○ | 1 | x | 0 | x | 0 | ○ | 1 | x | 0 |
| 3 | ○ | 1 | x | 0 | x | 0 | ○ | 1 | x | 0 |
| 4 | ○ | 1 | x | 0 | x | 0 | ○ | 1 | x | 0 |
| 5 | Δ | 0 | x | 0 | x | 0 | ○ | 1 | x | 0 |
| 6 | Δ | 0 | ○ | 1 | ○ | 1 | ○ | 1 | ○ | 1 |
| 7 | * | * | ○ | 1 | ○ | 1 | ○ | 1 | ○ | 1 |
| 8 | ○ | 1 | ○ | 1 | ○ | 1 | x | 0 | x | 0 |
| 9 | | | | | F | | | | | |
| 10 | | | | | F | | | | | |
| 11 | | | | | F | | | | | |
| 12 | | | | | F | | | | | |
| 13 | | | | | F | | | | | |
| 14 | | | | | F | | | | | |
| 15 | ○ | 1 | ○ | 1 | ○ | 1 | x | 0 | x | 0 |
| 16 | ○ | 1 | ○ | 1 | ○ | 1 | x | 0 | x | 0 |
| 17 | ○ | 1 | ○ | 1 | ○ | 1 | x | 0 | x | 0 |
| 18 | ○ | 1 | ○ | 1 | ○ | 1 | x | 0 | x | 0 |
| COMPARATIVE EXAMPLE 19 | ○ | 1 | ○ | 1 | ○ | 1 | x | 0 | x | 0 |

| Test 1 | Solvents | | | | | | | | | |
|---|---|---|---|---|---|---|---|---|---|---|
| | THF | | MEK | | NMP | | Acetone | | Dichloromethane | |
| | Visual observation | SEM analysis | Visual observation | SEM analysis | Visual observation | SEM analysis | Visual observation | SEM analysis | Visual observation | SEM analysis |
| COMPARATIVE EXAMPLE 1 | x | 0 | x | 0 | x | 0 | x | 0 | ○ | 1 |
| 2 | x | 0 | x | 0 | x | 0 | x | 0 | ○ | 1 |
| 3 | x | 0 | x | 0 | x | 0 | x | 0 | x | 0 |
| 4 | x | 0 | x | 0 | x | 0 | x | 0 | ○ | 0 |
| 5 | x | 0 | x | 0 | x | 0 | x | 0 | ○ | 0 |
| 6 | ○ | 1 | ○ | 1 | ○ | 1 | ○ | 1 | ○ | 1 |
| 7 | ○ | 1 | ○ | 1 | ○ | 1 | ○ | 1 | ○ | 1 |
| 8 | x | 0 | x | 0 | x | 0 | x | 0 | x | 0 |
| 9 | | | | | F | | | | | |
| 10 | | | | | F | | | | | |
| 11 | | | | | F | | | | | |
| 12 | | | | | F | | | | | |
| 13 | | | | | F | | | | | |
| 14 | | | | | F | | | | | |
| 15 | x | 0 | x | 0 | x | 0 | x | 0 | x | 0 |
| 16 | x | 0 | x | 0 | x | 0 | x | 0 | x | 0 |
| 17 | x | 0 | x | 0 | x | 0 | x | 0 | x | 0 |
| 18 | x | 0 | x | 0 | x | 0 | x | 0 | x | 0 |
| COMPARATIVE EXAMPLE 19 | x | 0 | x | 0 | x | 0 | x | 0 | x | 0 |

○: Dispersed
Δ: Partly dispersed
x: Dissolved
1: Particle retaining shape of the base particle
0: Particle no longer retaining shape of the base particle
*: Normal temperature ○. Elevated temperature x
F: Particle dissolved before it was synthesized (Evaluation test 2)

1 g of the particles prepared in each of EXAMPLES 1 to 41 and COMPARATIVE EXAMPLES 1 to 19, put on an aluminum Petri dish, was cured for 1 hour in a drier kept at 180° C., to confirm the residual particles on the dish. The residual particles were analyzed by an SEM (Hitachi's S-2150) to confirm their shape. The evaluation results are given in Table 7.

TABLE 7

| Test 2 | Visual observation | SEM analysis |
|---|---|---|
| EXAMPLE 1 | ○ | 2 |
| EXAMPLE 2 | ○ | 2 |
| EXAMPLE 3 | ○ | 2 |
| EXAMPLE 4 | ○ | 2 |
| EXAMPLE 5 | ○ | 2 |
| EXAMPLE 6 | ○ | 2 |

TABLE 7-continued

| Test 2 | Visual observation | SEM analysis |
|---|---|---|
| EXAMPLE 7 | ○ | 2 |
| EXAMPLE 8 | ○ | 2 |
| EXAMPLE 9 | ○ | 2 |
| EXAMPLE 10 | ○ | 2 |
| EXAMPLE 11 | ○ | 2 |
| EXAMPLE 12 | ○ | 2 |
| EXAMPLE 13 | ○ | 2 |
| EXAMPLE 14 | ○ | 2 |
| EXAMPLE 15 | ○ | 2 |
| EXAMPLE 16 | ○ | 2 |
| EXAMPLE 17 | ○ | 2 |
| EXAMPLE 18 | ○ | 2 |
| EXAMPLE 19 | ○ | 2 |
| EXAMPLE 20 | ○ | 2 |
| EXAMPLE 21 | ○ | 2 |
| EXAMPLE 22 | ○ | 2 |
| EXAMPLE 23 | ○ | 2 |
| EXAMPLE 24 | ○ | 2 |
| EXAMPLE 25 | ○ | 2 |
| EXAMPLE 26 | ○ | 2 |
| EXAMPLE 27 | ○ | 2 |
| EXAMPLE 28 | ○ | 2 |
| EXAMPLE 29 | ○ | 2 |
| EXAMPLE 30 | ○ | 2 |
| EXAMPLE 31 | ○ | 2 |
| EXAMPLE 32 | ○ | 2 |
| EXAMPLE 33 | ○ | 2 |
| EXAMPLE 34 | ○ | 2 |
| EXAMPLE 35 | ○ | 2 |
| EXAMPLE 36 | ○ | 2 |
| EXAMPLE 37 | ○ | 2 |
| EXAMPLE 38 | ○ | 2 |
| EXAMPLE 39 | ○ | 2 |
| EXAMPLE 40 | ○ | 2 |
| EXAMPLE 41 | ○ | 2 |
| COMPARATIVE EXAMPLE 1 | Δ | 1 |
| COMPARATIVE EXAMPLE 2 | x | 0 |
| COMPARATIVE EXAMPLE 3 | x | 0 |
| COMPARATIVE EXAMPLE 4 | x | 0 |
| COMPARATIVE EXAMPLE 5 | x | 0 |
| COMPARATIVE EXAMPLE 6 | ○ | 2 |
| COMPARATIVE EXAMPLE 7 | ○ | 2 |
| COMPARATIVE EXAMPLE 8 | x | 0 |
| COMPARATIVE EXAMPLE 9 | | F |
| COMPARATIVE EXAMPLE 10 | | F |
| COMPARATIVE EXAMPLE 11 | | F |
| COMPARATIVE EXAMPLE 12 | | F |
| COMPARATIVE EXAMPLE 13 | | F |
| COMPARATIVE EXAMPLE 14 | | F |
| COMPARATIVE EXAMPLE 15 | Δ | 1 |
| COMPARATIVE EXAMPLE 16 | Δ | 1 |
| COMPARATIVE EXAMPLE 17 | Δ | 1 |
| COMPARATIVE EXAMPLE 18 | Δ | 1 |
| COMPARATIVE EXAMPLE 19 | Δ | 1 |

○: Particle retaining its shape
Δ: Particle dissolved to some extent
x: Particle dissolved into a plate shape
2: Particle retaining its original shape
1: Particle deformed
0: Particle no longer retaining its particular shape
F: Particle dissolved before it was synthesized Spherical Particle Syntheis Example 1

Comparative Example 20

A 500 mL flask was charged with the mixture of the following composition all at once, and heated for around 15 hours in a flow of nitrogen with stirring by an agitator in an oil bath kept at 80° C., after dissolved oxygen was purged with nitrogen, to prepare the styrene/methacrylate copolymer particle solution.

| | |
|---|---|
| Styrene | 48.2 parts |
| Methacrylic acid | 20.6 parts |
| Methanol | 162.0 parts |
| Ethanol | 40.5 parts |
| Water | 67.5 parts |
| Azobis-2-methylbutylonitrile (ABNE) | 3.1 part |
| 15% by weight of methanol solution of PVP 8K-120) | 82.0 parts |

These particles had a volume-average particle diameter of 1.9 μm, determined by particle size distribution analysis. They were truly spherical, having a smallest particle diameter of 0.29 μm and a largest particle diameter of 3.69 μm, determined by SEM analysis. Part of the particle solution was treated by around 3 to 5 cycles of washing with a water/methanol (3/7) mixed solution and filtration by a vacuum filtration unit, and dried under a vacuum to prepare the crosslinked particles. A portion of these particles were named COMPARATIVE EXAMPLE 20 particles.

Spherical Particle Syntheis Example 21

Comparative Example 21

A 500 mL flask was charged with the mixture of the following composition all at once, and heated for around 15 hours in a flow of nitrogen with stirring by an agitator in an oil bath kept at 80° C., after dissolved oxygen was purged with nitrogen, to prepare the styrene/acrylate copolymer particle solution.

| | |
|---|---|
| Styrene | 48.2 parts |
| Acrylic acid | 20.6 parts |
| Methanol | 162.0 parts |
| Ethanol | 54.0 parts |
| Water | 54.0 parts |
| Azobis-2-methylbutylonitrile (ABNE) | 3.1 parts |

-continued

| | |
|---|---|
| Styrene/methacrylate copolymer resin solution | 60.0 parts |
| (The styrene/methacrylate copolymer resin solution was a 40% by weight methanol solution of styrene/2-hydroxyethyl methacrylate (2/8). | |

These particles had a volume-average particle diameter of 12.9 μm, determined by particle size distribution analysis. They were truly spherical, having a smallest particle diameter of 5.9 μm and a largest particle diameter of 37 μm, determined by SEM analysis. Part of the particle solution was treated by around 3 to 5 cycles of washing with a water/methanol (3/7) mixed solution and filtration by a vacuum filtration unit, and dried under a vacuum to prepare the crosslinked particles. A portion of these particles were named COMPARATIVE EXAMPLE 21 particles.

Spherical Particle Syntheis Example 3

Comparative Example 22

A 500 mL flask was charged with the mixture of the following composition all at once, and heated for around 15 hours in a flow of nitrogen with stirring by an agitator in an oil bath kept at 70° C., after dissolved oxygen was purged with nitrogen, to prepare the styrene/methacrylate copolymer particle solution.

| | |
|---|---|
| Styrene | 44.7 parts |
| Methacrylic acid | 24.1 parts |
| Methanol | 94.5 parts |
| Ethanol | 87.8 parts |
| Water | 87.8 parts |
| Azobis-isobutylonitrile (AIBN) | 8.1 parts |
| Styrene/methacrylate copolymer resin solution | 80.0 parts |
| (The styrene/methacrylate copolymer resin solution was a 40% by weight methanol solution of styrene/2-hydroxyethyl methacrylate (1/9). | |

These particles had a volume-average particle diameter of 10.5 μm, determined by particle size distribution analysis. They were truly spherical, having a smallest particle diameter of 5.8 μm and a largest particle diameter of 31 μm, determined by SEM analysis. Half of the particle solution was treated by around 3 to 5 cycles of washing with a water/methanol (3/7) mixed solution and filtration by a vacuum filtration unit, and dried under a vacuum to prepare the crosslinked particles. These particles were named COMPARATIVE EXAMPLE 22 particles.

Spherical Particle Syntheis Example 4

Comparative Example 23

A 500 mL flask was charged with the mixture of the following composition all at once, and heated for around 15 hours in a flow of nitrogen with stirring by an agitator in an oil bath kept at 62° C., after dissolved oxygen was purged with nitrogen, to prepare the styrene/methacrylate copolymer particle solution.

| | |
|---|---|
| Styrene | 61.9 parts |
| Methacrylic acid | 6.9 parts |
| Methanol | 90.3 parts |

-continued

| | |
|---|---|
| Azobis-isobutylonitrile (AIBN) | 1.6 parts |
| Styrene/methacrylate copolymer resin solution | 90.7 parts |
| (The styrene/methacrylate copolymer resin solution was a 40% by weight methanol solution of styrene/2-hydroxyethyl methacrylate (1/9). | |

These particles had a volume-average particle diameter of 7.6 μm, determined by particle size distribution analysis. They were truly spherical, having a smallest particle diameter of 3.2 μm and a largest particle diameter of 13.2 μm, determined by SEM analysis. The particle solution was treated by around 3 to 5 cycles of washing with methanol and filtration by a vacuum filtration unit, and dried under a vacuum to prepare the crosslinked particles. These particles were named COMPARATIVE EXAMPLE 23 particles.

SYNTHESIS EXAMPLES 1 to 4 to prepare the spherical particles are summarized in Table 8.

TABLE 8

| | Functional group in the particle | Equivalents of the functional group | Starting compounds used |
|---|---|---|---|
| SPHERICAL PARTICLE EXAMPLE 1 | Carboxyl | 287/COOH | Styrene and methacrylic acid |
| SPHERICAL PARTICLE EXAMPLE 2 | Carboxyl | 240/COOH | Styrene and acrylic acid |
| SPHERICAL PARTICLE EXAMPLE 3 | Carboxyl | 246/COOH | Styrene and methacrylic acid |
| SPHERICAL PARTICLE EXAMPLE 4 | Carboxyl | 860/COOH | Styrene and methacrylic acid |

Example 42

A 300 mL flask was charged with the mixture of the following composition all at once, and heated for around 15 hours in a flow of nitrogen with stirring by an agitator in an oil bath kept at 40° C., to prepare the carbodiimide-containing, crosslinked particle solution.

| | |
|---|---|
| Particles prepared in SPHERICAL PARTICLE SYNTHEISIS EXAMPLE 1 | 5.0 parts |
| Carbodiimide resin solution prepared in SYNTHESIS EXAMPLE 7 | 65.0 parts |
| Methanol | 109.2 parts |
| Water | 20.8 parts |

Next, the solution was treated by around 3 to 5 cycles of washing with a water/methanol (3/7) mixed solution and filtration by a vacuum filtration unit, and dried under a vacuum to prepare the crosslinked particles.

Example 43

A 300 mL flask was charged with the mixture of the following composition all at once, and heated for around 15 hours in a flow of nitrogen with stirring by an agitator in an oil bath kept at 25° C., to prepare the carbodiimide-containing, crosslinked particle solution.

| | |
|---|---|
| Particles prepared in SPHERICAL PARTICLE SYNTHEISIS EXAMPLE 1 | 8.0 parts |
| Carbodiimide resin solution prepared in SYNTHESIS EXAMPLE 10 | 37.0 parts |
| Methanol | 62.2 parts |
| Water | 11.8 parts |

Next, the solution was treated by around 3 to 5 cycles of washing with a water/methanol (3/7) mixed solution and filtration by a vacuum filtration unit, and dried under a vacuum to prepare the crosslinked particles.

Example 44

A 300 mL flask was charged with the mixture of the following composition all at once, and heated for around 15 hours in a flow of nitrogen with stirring by an agitator in an oil bath kept at 45° C., to prepare the carbodiimide-containing, crosslinked particle solution.

| | |
|---|---|
| Particle solution prepared in SPHERICAL PARTICLE SYNTHEISIS EXAMPLE 2 | 30.0 parts |
| Carbodiimide resin solution prepared in SYNTHESIS EXAMPLE 7 | 74.7 parts |
| Methanol | 67.2 parts |
| Water | 37.3 parts |

Next, the solution was treated by around 3 to 5 cycles of washing with a water/methanol (3/7) mixed solution and filtration by a vacuum filtration unit, and dried under a vacuum to prepare the crosslinked particles.

Example 45

A 300 mL flask was charged with the mixture of the following composition all at once, and heated for around 15 hours in a flow of nitrogen with stirring by an agitator in an oil bath kept at 45° C., to prepare the carbodiimide-containing, crosslinked particle solution.

| | |
|---|---|
| Particle solution prepared in SPHERICAL PARTICLE SYNTHEISIS EXAMPLE 2 | 30.0 parts |
| Carbodiimide resin solution prepared in SYNTHESIS EXAMPLE 8 | 65.5 parts |
| Methanol | 78.6 parts |
| Water | 52.4 parts |

Next, the solution was treated by around 3 to 5 cycles of washing with a water/methanol (3/7) mixed solution and filtration by a vacuum filtration unit, and dried under a vacuum to prepare the crosslinked particles.

Example 46

A 300 mL flask was charged with the mixture of the following composition all at once, and heated for around 15 hours in a flow of nitrogen with stirring by an agitator in an oil bath kept at 50° C., to prepare the carbodiimide-containing, crosslinked particle solution.

| | |
|---|---|
| Particles prepared in SPHERICAL PARTICLE SYNTHEISIS EXAMPLE 3 | 8.0 parts |
| Carbodiimide resin solution prepared in SYNTHESIS EXAMPLE 1 | 68.2 parts |
| Toluene | 102.3 parts |

Next, the solution was treated by around 3 to 5 cycles of washing with toluene and filtration by a vacuum filtration unit, and dried under a vacuum to prepare the crosslinked particles.

Example 47

A 300 mL flask was charged with the mixture of the following composition all at once, and heated for around 15 hours in a flow of nitrogen with stirring by an agitator in an oil bath kept at 60° C., to prepare the carbodiimide-containing, crosslinked particle solution.

| | |
|---|---|
| Particles prepared in SPHERICAL PARTICLE SYNTHEISIS EXAMPLE 3 | 8.0 parts |
| Carbodiimide resin solution prepared in SYNTHESIS EXAMPLE 3 | 58.2 parts |
| Toluene | 135.8 parts |

Next, the solution was treated by around 3 to 5 cycles of washing with toluene and filtration by a vacuum filtration unit, and dried under a vacuum to prepare the crosslinked particles.

Example 48

A 300 mL flask was charged with the mixture of the following composition all at once, and heated for around 15 hours in a flow of nitrogen with stirring by an agitator in an oil bath kept at 30° C., to prepare the carbodiimide-containing, crosslinked particle solution.

| | |
|---|---|
| Particles prepared in SPHERICAL PARTICLE SYNTHEISIS EXAMPLE 3 | 10.0 parts |
| Carbodiimide resin solution prepared in SYNTHESIS EXAMPLE 6 | 66.4 parts |
| Toluene | 99.6 parts |

Next, the solution was treated by around 3 to 5 cycles of washing with toluene and filtration by a vacuum filtration unit, and dried under a vacuum to prepare the crosslinked particles.

Example 49

A 300 mL flask was charged with the mixture of the following composition all at once, and heated for around 15 hours in a flow of nitrogen with stirring by an agitator in an oil bath kept at 60° C., to prepare the carbodiimide-containing, crosslinked particle solution.

| | |
|---|---|
| Particle solution prepared in SPHERICAL PARTICLE SYNTHEISIS EXAMPLE 3 | 30.0 parts |
| Carbodiimide resin solution prepared in SYNTHESIS EXAMPLE 8 | 63.8 parts |
| Methanol | 76.6 parts |
| Water | 51.1 parts |

Next, the solution was treated by around 3 to 5 cycles of washing with a water/methanol (3/7) mixed solution and filtration by a vacuum filtration unit, and dried under a vacuum to prepare the crosslinked particles.

Example 50

A 300 mL flask was charged with the mixture of the following composition all at once, and heated for around 15 hours in a flow of nitrogen with stirring by an agitator in an oil bath kept at 30° C., to prepare the carbodiimide-containing, crosslinked particle solution.

| | |
|---|---|
| Particle solution prepared in SPHERICAL PARTICLE SYNTHEISIS EXAMPLE 3 | 40.0 parts |
| Carbodiimide resin solution prepared in SYNTHESIS EXAMPLE 10 | 57.5 parts |
| Methanol | 56.4 parts |
| Water | 1.2 parts |

Next, the solution was treated by around 3 to 5 cycles of washing with a water/methanol (3/7) mixed solution and filtration by a vacuum filtration unit, and dried under a vacuum to prepare the crosslinked particles.

Comparative Example 24

A 300 mL flask was charged with the mixture of the following composition all at once. However, the particles were dissolved.

| | |
|---|---|
| Particles prepared in SPHERICAL PARTICLE SYNTHEISIS EXAMPLE 4 | 10.0 parts |
| Carbodiimide resin solution prepared in SYNTHESIS EXAMPLE 5 | 30.5 parts |
| Toluene | 122.1 parts |

Comparative Example 25

A 300 mL flask was charged with the mixture of the following composition all at once, and heated for around 15 hours in a flow of nitrogen with stirring by an agitator in an oil bath kept at 50° C., to prepare the carbodiimide-containing, crosslinked particle solution.

| | |
|---|---|
| Particles prepared in SPHERICAL PARTICLE SYNTHEISIS EXAMPLE 4 | 10.0 parts |
| Carbodiimide resin solution prepared in SYNTHESIS EXAMPLE 7 | 43.3 parts |
| Methanol | 72.8 parts |
| Water | 13.9 parts |

Next, the solution was treated by around 3 to 5 cycles of washing with a water/methanol (3/7) mixed solution and filtration by a vacuum filtration unit, and dried under a vacuum to prepare the crosslinked particles.

Comparative Example 26

A 300 mL flask was charged with the mixture of the following composition all at once, and heated for around 15 hours in a flow of nitrogen with stirring by an agitator in an oil bath kept at 30° C., to prepare the carbodiimide-containing, crosslinked particle solution.

| | |
|---|---|
| Particles prepared in SPHERICAL PARTICLE SYNTHEISIS EXAMPLE 4 | 10.0 parts |
| Carbodiimide resin solution prepared in SYNTHESIS EXAMPLE 10 | 20.6 parts |
| Methanol | 77.5 parts |
| Water | 24.9 parts |

Next, the solution was treated by around 3 to 5 cycles of washing with a water/methanol (3/7) mixed solution and filtration by a vacuum filtration unit, and dried under a vacuum to prepare the crosslinked particles.

EXAMPLES 42 to 50 are summarized in Table 9, and COMPARATIVE EXAMPLES 20 to 26 in Table 10.

TABLE 9

| EXAMPLES | Starting diisocyanate compound for carbodiimidation | Content of carbodiimide (equivalents) (NCN/functional group) | Reaction temperature (° C.) | Solvents | Solution concentration (% by weight) (Total solution − Solvent)/Total solution × 100 |
|---|---|---|---|---|---|
| 42 | HMDI | 5 | 40 | Water/methanol, mixture | 22.0 |
| 43 | TDI | 3 | 25 | Water/methanol, mixture | 25.4 |
| 44 | HMDI | 4 | 45 | Water/methanol, mixture | 24.3 |
| 45 | TMXDI | 5 | 45 | Water/methanol, mixture | 20.0 |
| 46 | HMDI | 4 | 50 | Toluene | 23.6 |
| 47 | TMXDI | 4 | 60 | Toluene | 18.4 |
| 48 | MDI | 4 | 30 | Toluene | 24.5 |
| 49 | TMXDI | 5 | 60 | Water/methanol, mixture | 20.0 |
| 50 | TDI | 4 | 30 | Water/methanol, mixture | 27.4 |

TABLE 10

| COMPARATIVE EXAMPLES | Starting diisocyanate compound for carbodiimidation | Content of carbodiimide (equivalents) (NCN/functional group) | Reaction temperature (° C.) | Solvents | Solution concentration (% by weight) (Total solution − Solvent)/Total solution × 100 |
|---|---|---|---|---|---|
| 20 | No carbodiimide was contained in the particle | | — | — | — |
| 21 | | | | | |
| 22 | | | | | |
| 23 | | | | | |
| 24 | TDI | 8 | — | Toluene | 15.5 |
| 25 | HMDI | 5 | 50 | Water/methanol, mixture | 25.7 |
| 26 | TDI | 4 | 30 | Water/methanol, mixture | 16.8 |

(Evaluation Test 3)

A 300 mL flask was charged with 1 g of the particles prepared in each of EXAMPLES 42 to 50 and COMPARATIVE EXAMPLES 20 to 26, water and 100 mL of an organic solvent described in Table 11. Each of the resultant mixtures was stirred at normal temperature for 30 minutes. Then, it was visually observed to confirm its resistance to solvents, and also analyzed by an SEM (Hitachi's S-2150) to confirm the particle shape. The evaluation results are given in Table 11.

TABLE 11

| | Solvents | | | | | | | | | |
|---|---|---|---|---|---|---|---|---|---|---|
| | Water | | Methanol | | Ethanol | | Toluene | | DMF | |
| Test 3 | Visual observation | SEM analysis | Visual observation | SEM analysis | Visual observation | SEM analysis | Visual observation | SEM analysis | Visual observation | SEM analysis |
| EXAMPLE 42 | ○ | 1 | ○ | 1 | ○ | 1 | ○ | 1 | ○ | 1 |
| EXAMPLE 43 | ○ | 1 | ○ | 1 | ○ | 1 | ○ | 1 | ○ | 1 |
| EXAMPLE 44 | ○ | 1 | ○ | 1 | ○ | 1 | ○ | 1 | ○ | 1 |
| EXAMPLE 45 | ○ | 1 | ○ | 1 | ○ | 1 | ○ | 1 | ○ | 1 |
| EXAMPLE 46 | ○ | 1 | ○ | 1 | ○ | 1 | ○ | 1 | ○ | 1 |
| EXAMPLE 47 | ○ | 1 | ○ | 1 | ○ | 1 | ○ | 1 | ○ | 1 |
| EXAMPLE 48 | ○ | 1 | ○ | 1 | ○ | 1 | ○ | 1 | ○ | 1 |
| EXAMPLE 49 | ○ | 1 | ○ | 1 | ○ | 1 | ○ | 1 | ○ | 1 |
| EXAMPLE 50 | ○ | 1 | ○ | 1 | ○ | 1 | ○ | 1 | ○ | 1 |
| COMPARATIVE EXAMPLE 20 | ○ | 1 | x | 0 | x | 0 | Δ | 0 | x | 0 |
| COMPARATIVE EXAMPLE 21 | ○ | 1 | x | 0 | x | 0 | Δ | 0 | x | 0 |
| COMPARATIVE EXAMPLE 22 | ○ | 1 | x | 0 | x | 0 | ○ | 1 | x | 0 |
| COMPARATIVE EXAMPLE 23 | ○ | 1 | ○ | 1 | ○ | 1 | x | 0 | x | 0 |
| COMPARATIVE EXAMPLE 24 | | | | | F | | | | | |
| COMPARATIVE EXAMPLE 25 | ○ | 1 | ○ | 1 | ○ | 1 | x | 0 | x | 0 |
| COMPARATIVE EXAMPLE 26 | ○ | 1 | ○ | 1 | ○ | 1 | x | 0 | x | 0 |

| | Solvents | | | | | | | | | |
|---|---|---|---|---|---|---|---|---|---|---|
| | THF | | MEK | | NMP | | Acetone | | Dichloromethane | |
| Test 3 | Visual observation | SEM analysis | Visual observation | SEM analysis | Visual observation | SEM analysis | Visual observation | SEM analysis | Visual observation | SEM analysis |
| EXAMPLE 42 | ○ | 1 | ○ | 1 | ○ | 1 | ○ | 1 | ○ | 1 |
| EXAMPLE 43 | ○ | 1 | ○ | 1 | ○ | 1 | ○ | 1 | ○ | 1 |
| EXAMPLE 44 | ○ | 1 | ○ | 1 | ○ | 1 | ○ | 1 | ○ | 1 |
| EXAMPLE 45 | ○ | 1 | ○ | 1 | ○ | 1 | ○ | 1 | ○ | 1 |
| EXAMPLE 46 | ○ | 1 | ○ | 1 | ○ | 1 | ○ | 1 | ○ | 1 |
| EXAMPLE 47 | ○ | 1 | ○ | 1 | ○ | 1 | ○ | 1 | ○ | 1 |
| EXAMPLE 48 | ○ | 1 | ○ | 1 | ○ | 1 | ○ | 1 | ○ | 1 |
| EXAMPLE 49 | ○ | 1 | ○ | 1 | ○ | 1 | ○ | 1 | ○ | 1 |
| EXAMPLE 50 | ○ | 1 | ○ | 1 | ○ | 1 | ○ | 1 | ○ | 1 |
| COMPARATIVE EXAMPLE 20 | x | 0 | x | 0 | x | 0 | x | 0 | x | 0 |

TABLE 11-continued

| | | | | | | | | | | |
|---|---|---|---|---|---|---|---|---|---|---|
| COMPARATIVE EXAMPLE 21 | x | 0 | x | 0 | x | 0 | x | 0 | x | 0 |
| COMPARATIVE EXAMPLE 22 | x | 0 | x | 0 | x | 0 | x | 0 | Δ | 0 |
| COMPARATIVE EXAMPLE 23 | x | 0 | x | 0 | x | 0 | x | 0 | x | 0 |
| COMPARATIVE EXAMPLE 24 | | | | | F | | | | | |
| COMPARATIVE EXAMPLE 25 | x | 0 | x | 0 | x | 0 | x | 0 | x | 0 |
| COMPARATIVE EXAMPLE 26 | x | 0 | x | 0 | x | 0 | x | 0 | x | 0 | o: Dispersed
Δ: Partly dispersed
x: Dissolved
1: Particle retaining shape of the base particle
0: Particle no longer retaining shape of the base particle
*: Normal temperature o, Elevated temperature x
F: Particle dissolved before it was synthesized (Evaluation Test 4)

1 g of the particles prepared in each of EXAMPLES 42 to 50 and COMPARATIVE EXAMPLES 20 to 26, put on an aluminum Petri dish, was cured for 1 hour in a drier kept at 180° C., to confirm the residual particles on the dish. The residual particles were analyzed by an SEM (Hitachi's S-2150) to confirm their shape. The evaluation results are given in Table 12.

TABLE 12

| Test 4 | Visual observation | SEM analysis |
|---|---|---|
| EXAMPLE 42 | o | 2 |
| EXAMPLE 43 | o | 2 |
| EXAMPLE 44 | o | 2 |
| EXAMPLE 45 | o | 2 |
| EXAMPLE 46 | o | 2 |
| EXAMPLE 47 | o | 2 |
| EXAMPLE 48 | o | 2 |
| EXAMPLE 49 | o | 2 |
| EXAMPLE 50 | o | 2 |
| COMPARATIVE EXAMPLE 20 | x | 0 |
| COMPARATIVE EXAMPLE 21 | x | 0 |
| COMPARATIVE EXAMPLE 22 | Δ | 1 |
| COMPARATIVE EXAMPLE 23 | x | 0 |
| COMPARATIVE EXAMPLE 24 | F | |
| COMPARATIVE EXAMPLE 25 | Δ | 1 |
| COMPARATIVE EXAMPLE 26 | Δ | 1 | o: Particle retaining its shape
Δ: Particle dissolved to some extent
x: Particle dissolved into a plate shape
2: Particle retaining its original shape
1: Particle deformed
0: Particle no longer retaining its particular shape
F: Particle dissolved before it was synthesized (Evaluation Test 5)

A 5% by weight particle solution was prepared by dissolving 0.5 g of the particles prepared in each of EXAMPLES 1 to 50 and COMPARATIVE EXAMPLES 1 to 26 in 9.5 g of a water/methanol (3/7) solution. Then, a small quantity of the solution was spread on slide glass (Corning's) coated with a silane coupling agent containing amino group, and thermally treated for 30 minutes in a drier kept at 150° C. Next, the coated slide glass was immersed in a THF bath (5L) for 20 minutes, and then naturally dried to observe the slide glass surface conditions. The slide glass having deposits on the surface was analyzed by an SEM to confirm the particle shape again. The evaluation results are given in Table 13.

TABLE 13

| Test 2 | Visually observed deposits | SEM analysis |
|---|---|---|
| EXAMPLE 1 | o | Particle retaining its original shape |
| EXAMPLE 2 | o | Particle retaining its original shape |
| EXAMPLE 3 | o | Particle retaining its original shape |
| EXAMPLE 4 | o | Particle retaining its original shape |
| EXAMPLE 5 | o | Particle retaining its original shape |
| EXAMPLE 6 | o | Particle retaining its original shape |
| EXAMPLE 7 | o | Particle retaining its original shape |
| EXAMPLE 8 | o | Particle retaining its original shape |
| EXAMPLE 9 | o | Particle retaining its original shape |
| EXAMPLE 10 | o | Particle retaining its original shape |
| EXAMPLE 11 | o | Particle retaining its original shape |
| EXAMPLE 12 | o | Particle retaining its original shape |
| EXAMPLE 13 | o | Particle retaining its original shape |
| EXAMPLE 14 | o | Particle retaining its original shape |
| EXAMPLE 15 | o | Particle retaining its original shape |
| EXAMPLE 16 | o | Particle retaining its original shape |
| EXAMPLE 17 | o | Particle retaining its original shape |
| EXAMPLE 18 | o | Particle retaining its original shape |
| EXAMPLE 19 | o | Particle retaining its original shape |
| EXAMPLE 20 | o | Particle retaining its original shape |
| EXAMPLE 21 | o | Particle retaining its original shape |
| EXAMPLE 22 | o | Particle retaining its original shape |

TABLE 13-continued

| Test 2 | Visually observed deposits | SEM analysis |
|---|---|---|
| EXAMPLE 23 | o | Particle retaining its original shape |
| EXAMPLE 24 | o | Particle retaining its original shape |
| EXAMPLE 25 | o | Particle retaining its original shape |
| EXAMPLE 26 | o | Particle retaining its original shape |
| EXAMPLE 27 | o | Particle retaining its original shape |
| EXAMPLE 28 | o | Particle retaining its original shape |
| EXAMPLE 29 | o | Particle retaining its original shape |
| EXAMPLE 30 | o | Particle retaining its original shape |
| EXAMPLE 31 | o | Particle retaining its original shape |
| EXAMPLE 32 | o | Particle retaining its original shape |
| EXAMPLE 33 | o | Particle retaining its original shape |
| EXAMPLE 34 | o | Particle retaining its original shape |
| EXAMPLE 35 | o | Particle retaining its original shape |
| EXAMPLE 36 | o | Particle retaining its original shape |
| EXAMPLE 37 | o | Particle retaining its original shape |
| EXAMPLE 38 | o | Particle retaining its original shape |
| EXAMPLE 39 | o | Particle retaining its original shape |
| EXAMPLE 40 | o | Particle retaining its original shape |
| EXAMPLE 41 | o | Particle retaining its original shape |
| EXAMPLE 42 | o | Spherical particle |
| EXAMPLE 43 | o | Spherical particle |
| EXAMPLE 44 | o | Spherical particle |
| EXAMPLE 45 | o | Spherical particle |
| EXAMPLE 46 | o | Spherical particle |
| EXAMPLE 47 | o | Spherical particle |
| EXAMPLE 48 | o | Spherical particle |
| EXAMPLE 49 | o | Spherical particle |
| EXAMPLE 50 | o | Spherical particle |
| COMPARATIVE EXAMPLE 1 | x | — |
| COMPARATIVE EXAMPLE 2 | x | — |
| COMPARATIVE EXAMPLE 3 | x | — |
| COMPARATIVE EXAMPLE 4 | x | — |
| COMPARATIVE EXAMPLE 5 | x | — |
| COMPARATIVE EXAMPLE 6 | x | — |
| COMPARATIVE EXAMPLE 7 | x | — |
| COMPARATIVE EXAMPLE 8 | x | — |
| COMPARATIVE EXAMPLE 9 | | F |
| COMPARATIVE EXAMPLE 10 | | F |
| COMPARATIVE EXAMPLE 11 | | F |
| COMPARATIVE EXAMPLE 12 | | F |
| COMPARATIVE EXAMPLE 13 | | F |
| COMPARATIVE EXAMPLE 14 | | F |
| COMPARATIVE EXAMPLE 15 | o | Deformed particle |
| COMPARATIVE EXAMPLE 16 | o | Deformed particle |
| COMPARATIVE EXAMPLE 17 | o | Deformed particle |
| COMPARATIVE EXAMPLE 18 | o | Deformed particle |
| COMPARATIVE EXAMPLE 19 | o | Deformed particle |
| COMPARATIVE EXAMPLE 20 | x | — |
| COMPARATIVE EXAMPLE 21 | x | — |
| COMPARATIVE EXAMPLE 22 | x | — |
| COMPARATIVE EXAMPLE 23 | x | — |
| COMPARATIVE EXAMPLE 24 | | F |
| COMPARATIVE EXAMPLE 25 | o | Deformed particle |
| COMPARATIVE EXAMPLE 26 | o | Deformed particle | o: Deposits observed
x: No deposits observed (particle dissolved)
F: Particle dissolved before it was synthesized It is apparent from the results of EXAMPLES and COMPARATIVE EXAMPLES (given in Tables 1 to 13) that the particles prepared in each of EXAMPLES 1 to 50 show improved resistance to heat and solvents as the crosslinked particles, and excellent glueability and adhesion as the reactive particles.

On the other hand, the particles prepared in each of COMPARATIVE EXAMPLES 1 to 19 show little effects of resistance to heat and solvents as the crosslinked particles, and those prepared in each of COMPARATIVE EXAMPLES 20 to 26 show little effects of glueability and adhesion as the reactive particles.

It is apparent, based on these results, that the novel carbodiimide-containing resin particles of the present invention have excellent effects of resistance to heat and solvents, and glueability and adhesion.

Advantage of the Invention

The hardening type reactive particles of the present invention are each comprising a base particle (A) of thermoplastic resin having a functional group and carbodiimide compound (B) impregnated only in the surface layer section or both surface layer section and inside of the base particle, wherein the base particle (A) and carbodiimide compound (B) are strongly bonded to each other by the crosslinking reaction taking place under heating between the functional group in the former and carbodiimide group in the latter. As such, they show excellent performances in resistance to heat and solvents, and glueability and adhesion.

The hardening type reactive particles, keeping the above performances and being reactive crosslinked particles, can go into various areas, e.g., crosslinking agent, stabilizer for improving hydrolysis resistance, hardening agent for thermoplastic resins, adhesive agent, coating agent, paint, reinforcing material and aid for automobile and electric/electronic industries, furniture and building materials, and spacers for liquid crystals.

What is claimed is:

1. Hardening reactive particles each comprising a base particle (A) of thermoplastic resin having a functional group and carbodiimide compound (B) impregnated both its surface layer section and inside of the base particle, wherein
the base particle (A) and carbodiimide compound (B) are bonded to each other by the crosslinking reaction which takes place under heating between the functional group in the former and carbodiimide group in the latter.

2. The hardening reactive particles according to claim 1, wherein said base particle (A) has an average diameter of 0.01 to 10,000 µm.

3. The hardening reactive particles according to claim 1, wherein said base particle (A) is morphologically truly or nearly spherical.

4. The hardening reactive particles according to claim 1, wherein said functional group is at least one type of active hydrogen group selected from the group consisting of hydroxyl, carboxyl, amino and thiol group.

5. The hardening reactive particles according to claim 1, wherein said thermoplastic resin has 30 to 700 equivalents of said functional groups.

6. The hardening reactive particles according to claim 1, wherein said thermoplastic resin is one of styrene-based polymer, (meth)acrylate-based polymer, a copolymer produced by addition polymerization with another vinyl-based polymer, a polymer produced by hydrogen transfer polymerization, a polymer produced by polycondensation and polymer produced by addition condensation.

7. The hardening reactive particles according to claim 1, wherein said carbodiimide compound (B) is the carbodiimide resin represented by the chemical formula (1):

$$R^1-Y-(R^2-N=C=N)_n-R^2-Y-R^3 \quad (1)$$

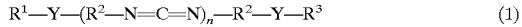

(wherein, $R^1$ and $R^3$ are each hydrogen or an organic residue of 1 to 40 carbon atoms, which is a compound having a functional group reactive with an isocyanate group left by the functional group, and may be the same or different; $R^2$ is an organic residue which is a diisocyanate left by an isocyanate group, where the diisocyanates may be different; Y is a bond formed by an isocyanate group and a functional group reactive with an isocyanate group; "n" is an integer of 1 to 100, representing an average degree of polymerization; and each of $R^1-Y$ and $Y-R^3$ may be an isocyanate group halfway in the reaction to be converted into the carbodiimide).

8. The hardening reactive particles according to claim 7, wherein said carbodiimide resin has 50 to 500 equivalents of carbodiimide (—NCN—) groups.

9. The hardening reactive particles according to claim 7, wherein said carbodiimide resin has a weight average molecular weight of 200 to 100,000.

10. The hardening reactive particles according to claim 7, wherein said carbodiimide resin has at least one type of hydrophilic segment and is soluble in water.

11. The hardening reactive particles according to claim 10, wherein said hydrophilic segment is represented by the chemical formula (1) with $R^1$ and $R^3$ being each at least one type of residue represented by one of the chemical formulae (2) to (5):

(i) a residue of alkyl sulfonate having at least one reactive hydroxyl group, represented by:

$$R^5-SO_3-R^4-OH \quad (2)$$

(wherein, $R^4$ is an alkylene group of 1 to 10 carbon atoms; and R5 is an alkali metal), (ii) a quaternary salt of a dialkylaminoalcohol residue represented by:

$$(R^6)_2-NR'-R^7-OH \quad (3)$$

(wherein, $R^6$ is a lower alkyl group of 1 to 4 carbon atoms; R7 is an alkylene or oxyalkylene group of 1 to 10 carbon atoms; and R' is a group derived from an agent for producing a quaternary salt), (iii) a quaternary salt of a dialkylaminoalkylamine residue represented by:

$$(R^6)_2-NR'-R^7-NH_2 \quad (4)$$

(wherein, $R^6$, $R^7$ and R' are each the same as the corresponding one in the formula (3), and (iv) a poly(alkylene oxide) residue sealed with alkoxy group at the terminals, having at least one reactive hydroxyl group, represented by:

$$R^8-(O-CHR^9-CH_2)_m-OH \quad (5)$$

(wherein, $R^8$ is a lower alkyl group of 1 to 4 carbon atoms; R9 is hydrogen atom or methyl group; and "m" is an integer of 2 to 30).

12. A crosslinking agent which comprises the hardening reactive particles according to claim 1.

13. A stabilizer for improving hydrolysis resistance which comprises the hardening reactive particles according to claim 1.

14. A thermoplastic resin-hardening agent which comprises the hardening reactive particles according to claim 1.

15. An adhesive agent which comprises the hardening reactive particles according to claim 1.

16. A coating material or paint which comprises the hardening reactive particles according to claim 1.

17. A reinforcing material for the electric/electronic areas which comprises the hardening reactive particles according to claim 1.

* * * * *